United States Patent [19]

Wolff

[11] Patent Number: 4,685,840

[45] Date of Patent: Aug. 11, 1987

[54] METHOD OF TRANSPORTING LARGE DIAMETER PARTICULATE MATTER

[76] Inventor: Robert C. Wolff, 955 Crystal St., New Orleans, La. 70124

[21] Appl. No.: 762,058

[22] Filed: Aug. 2, 1985

[51] Int. Cl.$^4$ ............................................. B65G 53/30
[52] U.S. Cl. ..................................... 406/47; 406/109; 406/120; 406/175; 406/197
[58] Field of Search ...................... 406/47–49, 406/197, 97, 46, 109, 106, 120, 175; 137/13, 625.31; 417/92, 93, 323, 122, 102, 103, 900, 142, 123; 251/144; 44/51; 210/194, 195.3; 414/140

[56] References Cited

U.S. PATENT DOCUMENTS

| | | | |
|---|---|---|---|
| 2,610,901 | 9/1952 | Cross | 406/49 |
| 3,617,095 | 11/1971 | Lissant | 406/187 |
| 3,637,263 | 1/1972 | Wasp | 406/49 |
| 3,762,773 | 10/1973 | Schroeder | 406/146 X |
| 3,883,269 | 5/1975 | Wolff | 414/140 X |
| 4,205,929 | 6/1980 | Schiffman et al. | 406/197 |
| 4,206,610 | 6/1980 | Santhanam | 137/13 X |
| 4,242,098 | 12/1980 | Braun et al. | 406/197 |
| 4,328,831 | 5/1982 | Wolff | 137/625.31 |
| 4,384,704 | 5/1983 | Wolff | 251/144 |
| 4,546,612 | 10/1985 | Santhanam | 406/197 |

Primary Examiner—Jeffrey V. Nase
Attorney, Agent, or Firm—Keaty & Keaty

[57] ABSTRACT

A method of transporting large diameter solids, such as coal having a diameter of greater than 1 inch, preferably eight to twelve inches, predicated on pipe diameter, in the form of a slurry through a pipeline is disclosed. The method comprises the step of placing large diameter solids in a vehicle and pumping it through a pipeline. The specific gravity of the vehicle is substantially equal to the specific gravity of the solids so that the coal remains in suspension over a wide range of pipeline velocities. A lubricant is added to the vehicle to reduce friction and enhance energy efficiency of the process. The coal is pumped from a pumping tank into which the solids and vehicle are introduced, the pumping tank, after filling, is pressurized with a fluid such as air or inert gas to propel the mixture through the pipeline. This pump and its valving allows large diameter solids to be pumped through the pipeline. The large diameter of the solids reduces the apparent viscosity of the slurry to greatly reduce friction and further enhance energy efficiency.

84 Claims, 15 Drawing Figures

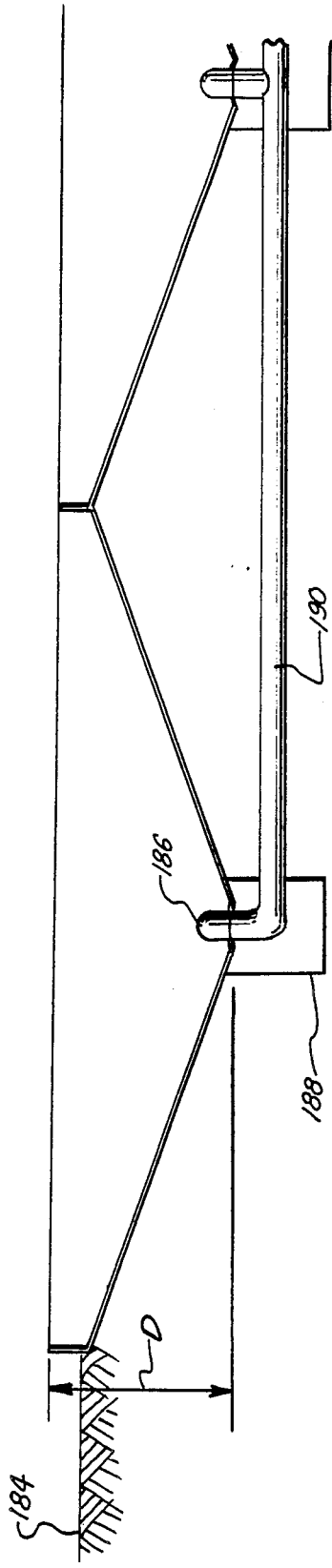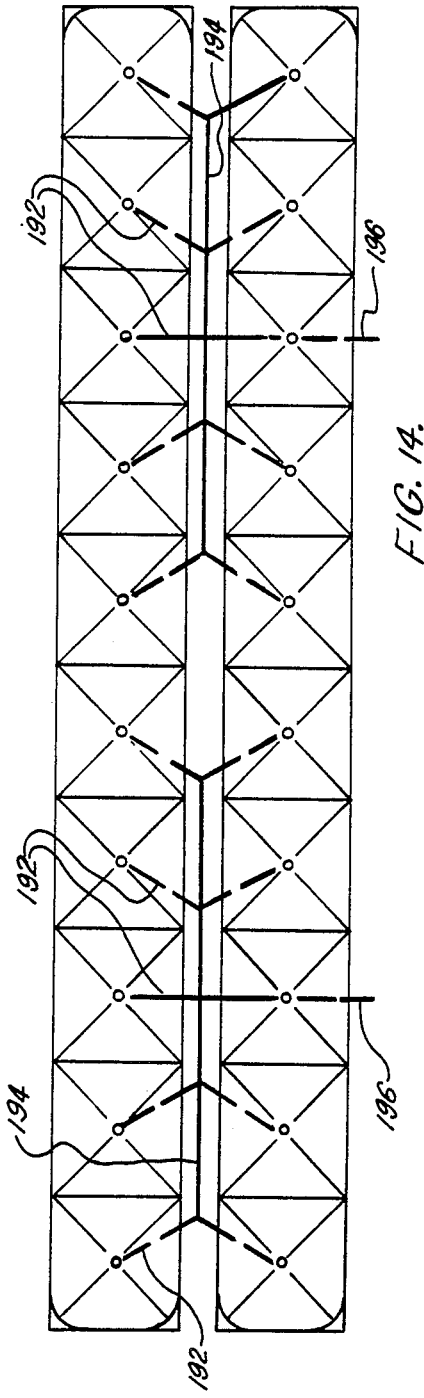

METHOD OF TRANSPORTING LARGE DIAMETER PARTICULATE MATTER

BACKGROUND OF THE INVENTION

1. Field of the Invention

This invention concerns transporting large diameter solids through pipelines. More specifically, it concerns transportation of coal in mine size pieces having diameters of greater than 2 inches.

2. General Discussion of the Background

It has been long been known that coal can be transported through pipelines in the form of finely ground particles suspended in a slurry. U.S. Pat. Nos. 2,791,472, 3,517,969, 3,637,263, 4,305,688, 4,436,528, 4,492,589, 4,502,868, 4,507,022 all disclose methods for transporting coal by first reducing it to finely ground particles and suspending it in a transport medium. All of these methods suffer the common defect, however, of greatly increasing the apparent viscosity of the coal by grinding it into small diameter particles which exposes more surface area of the solid. This increase in apparent viscosity makes it more difficult to pump the slurry through a pipeline, thereby substantially increasing energy requirements for transportation. These increases are passed on to consumers of electrical energy in the form of higher electric utility rates. The high apparent viscosity is not fundamentally necessary, but rather is necessitated by current mechanical pump designs which require grinding and pulverization of the coal.

Transportation of coal in the form of fine particles has many other disadvantages. The fine particles adsorb more liquid thereby making it difficult to separate the vehicle from the coal at the pipeline terminus. When the coal is later burned to produce electrical energy, the water must first be evaporated from the coal which thereby reduces the net yield of energy from the product. The slurry of fine particles is also a non-Newtonian liquid.

Yet another problem with finely ground particulate matter is that it is easily carried away by the wind after separation from the vehicle. Attrition by wind and other environmental influences once again increases the cost of energy and has the additional drawback of causing serious environmental pollution.

One of the reasons that prior art methods pumped small diameter particles was the size limitation imposed by the centrifugal or piston pumps that were used. These pumps were inherently incapable of pumping large diameter solids without damaging the pumps. An additional problem caused by these pumps was the introduction of turbulence into the pipeline which decreased the efficiency of flow and tended to degrade any lubricants which had been mixed into the vehicle to reduce friction. In addition, conventional valve designs may not permit proper seating with large diameter chunks.

In prior art pipelines, the velocity at which the coal slurries could be transported was also limited to a narrow range, thereby reducing the ability to send portions of the slurry through the shunt lines to potential markets at branch points en route.

Another problem encountered in prior art pipelines was the difficulty of initially mixing the vehicle and coal at points of pipeline origination or remobilization.

It is accordingly an object of this invention to create a mixture which is a Newtonian liquid with a relatively low apparent viscosity. This goal is achieved by increasing diameter of the solids. In turn, it is an object of this invention to minimize flow losses with the reduced viscosity.

Another object of the invention is to reduce the apparent viscosity and frictional loss of energy during transportation of mixtures.

Yet another object of the invention is to decrease turbulence within the pump and pipeline to thereby increase energy efficiency and reduce degradation of lubricants added to the mixture.

Still another object of the invention is to provide a method in which the coal or other solids can be easily mixed with a vehicle and separated therefrom at a termination point.

Another object of the invention is to provide a method in which the solid such as coal can be easily remobilized for transshipment.

Finally, it is an object of the invention to provide a method of pumping coal in which shunt lines can be employed for transportation of the slurry to remote locations off the main pipeline.

SUMMARY OF THE INVENTION

The aforementioned objects are achieved by transporting large diameter solids (for example, coal) thrrough a pipeline after placing it in a vehicle (preferably water) and pumping the resulting slurry or mixture through the pipeline. The specific gravity of the vehicle is made substantially equal to the specific gravity of the solids so that the coal will remain suspended in the mixture over a broad range of slurry velocities in the pipeline. A lubricant, such as a polymer that increases the molecular length of the vehicle, is added to the slurry to further reduce the viscosity of the solution and substantially eliminate friction within the pipeline. The lubricant also decreases adhesion between the solids and vehicle, thereby allowing complete and easy separation of the solid and liquid phases.

The slurry is pumped with a gaseous piston from a pumping body interposed in the pipeline. The pumping body is an elongated chamber having an inlet and an outlet. The inlet is opened to allow the slurry to enter the pumping body, the inlet then being closed and the outlet opened as gas under pressure is introduced into the pumping body to force the slurry into the pipeline. This pump provides a turbulence-free means of moving a mixture of vehicle and various sizes of product (from small particles to large chunks). Furthermore, the pump itself has no moving parts with the exception of rotary valves at the inlet and outlet, affording minimal wear and maintenance.

The gas (usually air or an inert gas which can be a by-product of combustion) is used as a piston or motive force in the pumping body is compressed in several stages before introduction into the pump. The step-wise compression begins after the slurry has been expelled from the pumping body and while the pumping body remains pressurized. Fluid communication is established between the pumping body and a first energy recovery tank to bleed the pressurized fluid to the first energy recovery tank. That fluid is then compressed to a higher pressure for reintroduction into the pumping body after the body is filled with slurry. The energy recovery system takes advantage of the physical fact that less energy is required to compress a gas in stages. In especially preferred embodiments, several stages of compression are employed.

A rotary valve is provided at the inlet and outlet of each pumping body. The rotary valves are comprised of a rotatable paddle carried between stationary plates. Cutaway portions of the stationary plates are fixed in aligned relationship with one another, and as the paddle rotates it moves its own cutaway portion into and out of aligned relationship with the cutaway portions of the stationary plates for opening and closing the valve. The rotatable paddle rides on an axle carried between the stationary plates, and the paddle is automatically sealed against one or the other of the stationary plates depending on the direction from which pressure is being applied.

The slurry is expelled from the pipeline into a stockpiling structure where the vehicle is removed from the slurry. Here the product builds up into a pile while the vehicle flows to the bottom of the vessel or structure where it is removed, to be recycled via a return line in a closed loop system. The separation of the vehicle from the product at the bottom of the pile is effected by a draining valve comprised of an annular stationary housing around a discharge opening in the bottom surface of the stockpiling structure. The stationary housing has an annular opening around its base, and an annular outer skirt slides contiguously within the housing between a first position in which it closes a substantial portion of the annular opening around the base, and a second position in which a greater portion of the area of the annular opening is exposed. An annular inner skirt fits in contiguous sliding relationship against an interior of the discharge opening in the bottom of the stockpiling structure. The inner skirt defines a flow retaining lip which is movable between a first position in which it is below the tangency of the bottom of the stockpiling structure and a second position in which it is spaced from the bottom of the stockpiling structure. The vehicle is separated from the particulate matter by moving the outer skirt to the first position and the inner skirt to the second position. In these relative orientations, the outer skirt drains the vehicle away from the coal at a slowed velocity, and the vehicle must move upwards over the flow retaining lip of the inner skirt to escape through the discharge opening. This ensures that any fines carried by the vehicle will be left in the stockpiling structure.

The coal can be remobilized by introducing vehicle into the stockpiling structure. When remobilization is required, the outer skirt is raised so that its lower lip defines the maximum height of the area exposed around the base of the housing. The angle of elevation of the lower lip of the outside skirt with reference to the edge of the discharge opening is substantially equal to but slightly less than the angle of repose of the particulate matter in the stockpiling structure. The introduction of fluid into the stockpiling structure will fluidize the coal and assure that the coal and vehicle are mixed in an optimal ratio. The mixing valve permits vehicle and product to be mixed automatically on a continuous basis, with a maximum ratio of product to vehicle. This mixing valve is located at the bottom of a containment vessel or stockpiling structure, which would be flooded with the vehicle to mobilize the product through the valve. The valve is connected to a pipe, which in turn communicates with the pump itself. The mixing valve can be operated in different modes. Indeed, by changing the mode, this valve operates as a separator of product and vehicle at a terminus of the line.

BRIEF DESCRIPTION OF THE DRAWINGS

A better understanding of the invention will be had by reference to the following drawings.

FIG. 14 is a top plan view of the stockpiling structure in which coal is stored at the pipeline terminus.

FIG. 15 is an enlarged cross-sectional view of the stockpiling structure.

DETAILED DESCRIPTION OF THE PREFERRED EMBODIMENT

The following detailed description is being made in accordance with provisions of law which require the inventor to make an enabling disclosure of the best mode of making and using the invention. This detailed description is not intended to limit the scope of the invention, which is more appropriately construed in accordance with the appended claims.

I. Summary of the Method

Figure 1:
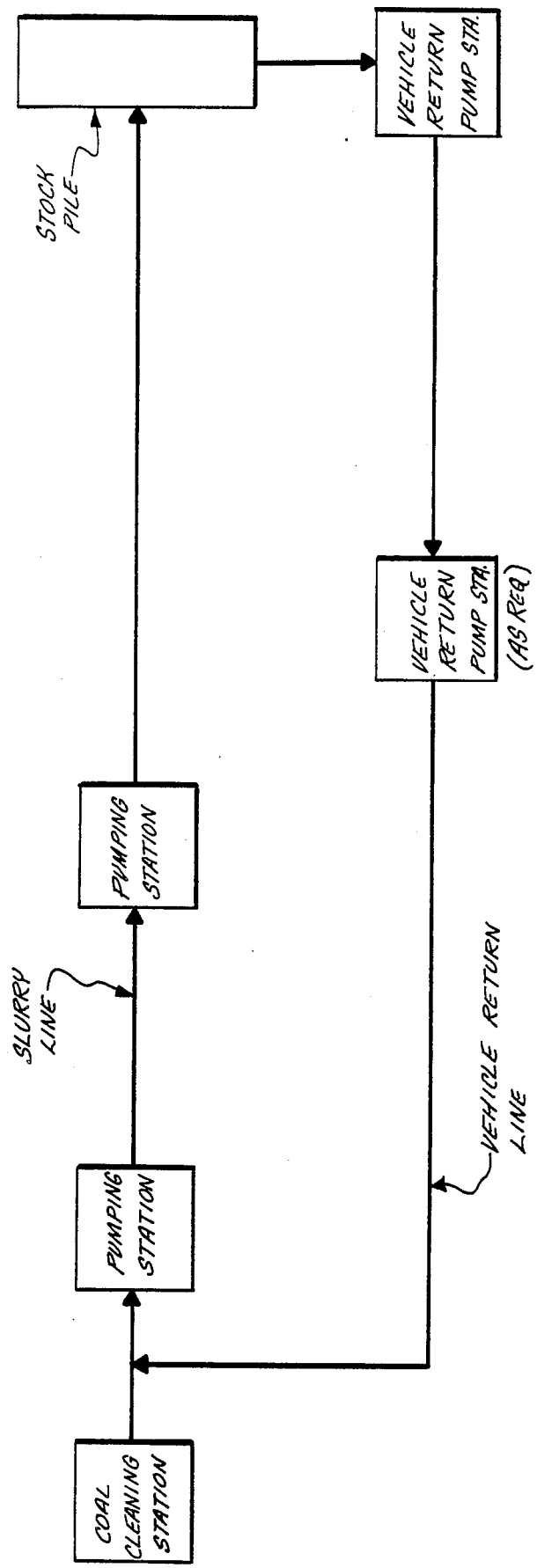
FIG. 1 is a schematic view of a slurry transportation pipeline built in accordance with the present invention.

A general schematic of the method is disclosed in FIG. 1. Coal is passed through a heavy plate with orifices which permit passage only of chunks of a desired diameter. In the preferred embodiment disclosed herein, with the dimensions of the valves as described below, chunks of 8 to 12 inches are preferred. These diameters approximately correspond to the size of pieces of coal that are produced at a mine, and this is referred to as "mine size" coal. The coal is fluidized with a vehicle, the proportion of vehicle to coal being about 30:70 by weight for the specific embodiment herein. The vehicle is comprised of water containing calcium chloride and a polymer lubricant (Polyox ® from Union Carbide), the specific gravity of the vehicle being about in close proximity to that of the vehicle being conveyed. In the specific example illustrated herein, the salt and polymer should be added to the water until a specific gravity of about 1.30 is achieved. Since coal has a specific gravity of about 1.33, the coal will more readily remain in suspension over a broad range of velocities in a pipeline. The ratio of 30:70 is preferred since that is the ratio the mixing valve automatically mixes the slurry into. It is possible, however, to further concentrate the solid portion by adding more coal to thereby bring the ratio of vehicle to solid to about 20:80 or more.

The increase in particle size of the solid is what permits the apparent viscosity to be reduced. It has been found that such a reduction is apparent viscosity can occur with particulate matter having a diameter of about 1 inch or greater, preferably 2 inches or greater. It is especially preferred that all or a great majority of the particles have a diameter of at least one or two inches. The dimension of the chunks will depend on the dimensions of the pipeline through which the slurry is being moved, but H has been found that with the dimensions described in this preferred embodiment, a particle diameter range of 8 to 12 inches is especially preferred.

The term "solids" should be understood to refer to a coherent, hard piece of matter having properties similar to coal. A consolidated piece of matter having defined boundaries and unlikely to break up is necessary to form the Newtonian liquid of the present invention.

The coal and vehicle are moved to a pumping station which is comprised of four specialized tanks which use a gaseous piston to move the slurry out of the tank and into the slurry line shown in FIG. 1. The pump (which is shown in greater detail in FIGS. 2 and 3) moves the slurry with minimal turbulence at very low velocities or up to about 18 feet per second. Presence of the polymer lubricant reduces friction within the pipeline to such an extent that a minimal number of booster pumping stations would be needed in a pipeline. In the preferred embodiment disclosed herein, a first pumping station is provided at the origination point of the pipeline and only a single booster pumping station should be required in a pipeline of about 1500 miles. This compares with about 10 booster stations required with prior art pipelines.

Coal is moved through the slurry line (either a main line or spur line) to a stockpile at a terminus. The terminus would preferably be located near a trans-shipment center or energy conversion plant. The slurry emerges from the slurry line into a stockpiling structure or transshipment vessel, and by use of mixing valves the vehicle can be removed from the coal in the stockpile and returned through a vehicle return line which carries the vehicle back to the original pumping station for reuse. The same mixing valve which permits removal of the vehicle also allows the coal in the stockpile to be readily remobilized and transshipped through slurry lines from the stockpile to more remote destinations.

The remainder of this specification describes the specialized pumps, mixing valves, rotary valves, energy recovery systems and stockpiling structures that are used with this method. It should nonetheless be apparent from this brief description of the system that it provides many advantages not previously known. For example, the amount of vehicle being used can be reduced from the prior art fifty-two percent to about thirty percent or less by weight. Reduction in the percentage of vehicle required permits smaller pipelines to be used, providing substantial savings on materials. Reduction in the amount of water is also an important factor when one considers that coal is generally pumped from areas where water is a scarce and expensive resource. The vehicle return line greatly reduces the amount of water required, eliminates the necessity and expense of obtaining water in areas where it is scarce and costly, and solves attendant pollution problems. This is practical due to instantaneous and near total separation of product from vehicle as a result of reduction of adhesion due to lubricant.

The ability to pump coal in chunks having diameters of one to twelve inches or more (predicated on pipeline size) avoids the necessity of grinding the coal before shipping it, centrifuging it at its termination point to remove the water, and avoids loss of ground coal particles by wind attrition. The larger diameter pieces of coal also have a much less apparent viscosity than ground coal because the greater than one or two inch pieces have much less surface area exposed. This reduction in apparent viscosity decreases turbulence and the amount of energy required to move the coal through the pipeline. The unground coal also absorbs less moisture, thereby increasing the btu's that can be obtained from the coal when it is finally used.

The advantages of transporting large diameter pieces of coal can be obtained by increasing the diameters of the particles above those found in prior art slurries of finely ground coal. The greater the diameters of the particles the greater will be the reduction in apparent viscosity because less total surface area of the particles will be exposed. Particles having diameters greater than about one inch will, for example, show a desireable reduction in apparent viscosity. Preferred embodiments use pieces of coal with diameters of greater than two inches, more preferably greater than six inches, and most preferably 8 to 12 inches in diameter.

Although this preferred embodiment of the invention describes transportation of coal, any kind of solid is suscepticle to being transported by this method. Examples of such solids are limestone or grain.

Other advantages of the system, which will be explained later in this disclosure, are its energy efficiency, reduced maintenance, reduction in pollution and substantial reduction in the number of pumps required to operate the pipeline.

II. Vehicle

As was previously mentioned, the vehicle in which the pieces of coals are suspended comprises about thirty percent of the slurry. Forty ppm of a polymer lubricant (typically polyethylene oxide, which can be obtained from Union Carbide Company under the trademark Polyox ®) is added to the vehicle to increase the molecular length of the molecules of water. The result is an elimination of more than seventy percent of the friction in the pipeline. The elimination of this friction helps reduce turbulence to such an extent that the velocity of the slurry in the pipeline can be increased by a factor of about 3.3 over prior art velocities (5.5×3.3=18) to about eighteen feet per second. This increase in velocity results in movement of three times the volume of product in a conventional size pipeline.

Addition of the polymer lubricant and reduction in the amount of water being used can also allow a reduction in the diameter of the pipe. For example, a conventional forty inch pipe (39 inch inner diameter) of the prior art could be reduced to a twenty four inch outer diameter (about twenty three inch outer diameter) pipe while doubling product tonnage carried by the conventional forty inch pipe. In addition, plastic pipe can preferably be used. Reduction in the size of the pipe and use of a plastic material will substantially reduce the cost of materials for new pipelines.

It has not previously been commercially feasible to use a polymer lubricant in transporting coal slurry since turbulence caused by conventional pumps and friction inside the pipeline deteriorates the polymer. The system of the present invention pumps the slurry mixture with reduced turbulence, thereby avoiding deterioration of the polymer and permitting its reuse. Another aspect of the present pumps is that they operate without introducing air into the pipeline, thereby avoiding oxidation of the polymer lubricant or pipeline structures. Since the polymer experiences little deterioration, it will remain in the vehicle to be pumped back to the point of origin for reuse, thereby enhancing the economic attractiveness of its use. Less amounts of polymer lubricant would have to be added to the slurry at its point of origin to bring it up to about 40 ppm of the vehicle portion, which is the desired amount in the preferred embodiment.

III. The Pump

Figure 2:
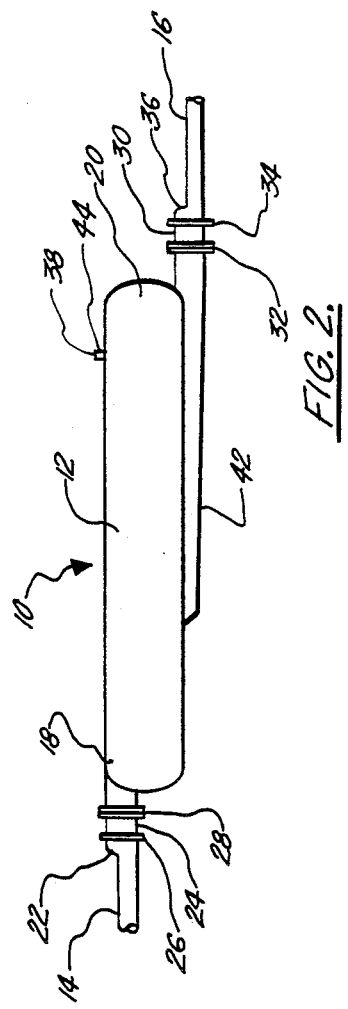
FIG. 2 is a side view of a pumping body for transporting the slurry through the pipeline.

A side view of pump 10 is shown in FIG. 2 to be comprised of a tank 12. The tank 12 is positioned between a slurry inlet line 14 and a slurry exhaust line 16. Inlet line 14 comes in at a higher elevation than exhaust line 16, and the inlet side 18 of pump body 12 is at a slightly higher elevation than the exhaust side 20 of body 12. Body 12 therefore sits on an incline with the exhaust end being lower than the inlet end. A typical pump body would be about 60 feet long.

Inlet line 14 is provided with an expansion nipple 22 which enlarges the cross-sectional area of the pipeline to accommodate a rotary inlet valve 24 between a pair of opposing flanges 26, 28. Exhaust line 16 is provided with a rotary exhaust valve 30 between a pair of flanges 32, 34 and a reduction nipple 36 for reducing the diameter of the pipeline to the diameter of exhaust line 16. A blower 38 is disposed on top of tank 12 and is part of an energy recovery system which will be discussed later.

Figure 3:
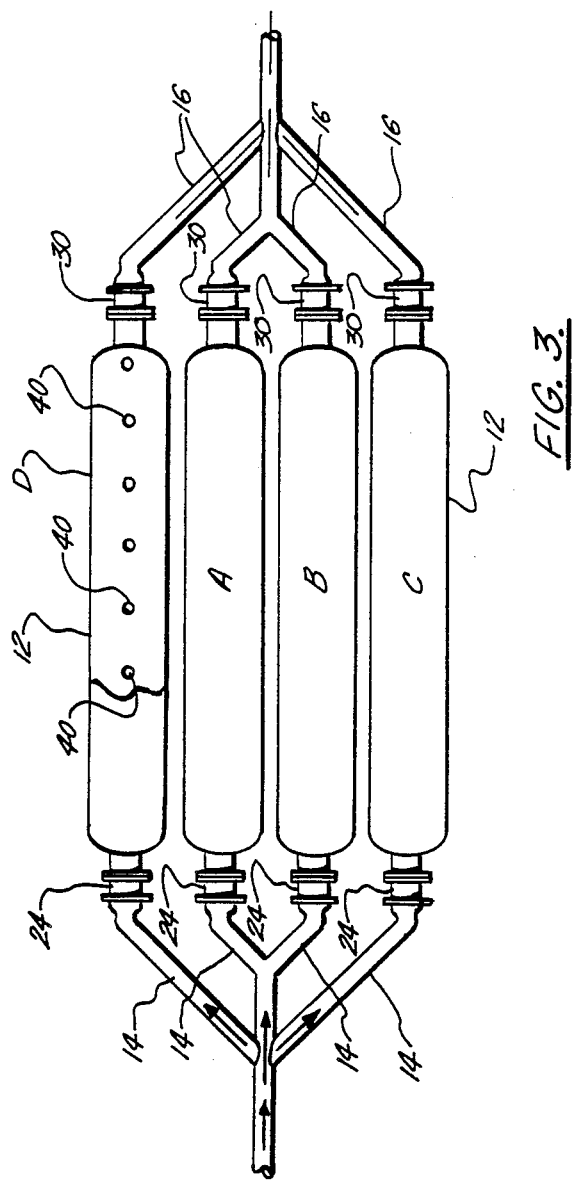
FIG. 3 is a top view of a plurality of pumping bodies such as that shown in FIG. 2, portions of a pumping body at the top being broken away to show orfices in the bottom of the pumping body that communicate with the pipeline.

Turning now to FIG. 3, which is a top view of the four tanks used in preferred embodiments of the present pumping system, it can be seen that a plurality of orifices 40 are provided in the bottom of each tank 12 (the orifices being shown only in the top tank which has a cut-away top). These orifices establish fluid communication between the interior of tank 12 and the interior of drain line 42. Orifices 40 are typically about ten inches in diameter. The diameter of the drainline 42 becomes progressively larger in the direction of the exhaust end 20 of tank 10.

In the embodiment of the pumping station shown in FIG. 3, tanks A, B and C are operational while the top tank D is a spare. The tanks operate in a sequential fashion to assure a constant and stable flow of slurry through the pipeline. The operation of tank A will be described first. In operation, the intake rotary valve 24 and exhaust valve 30 of pump A are closed. Inlet valve 24 of tank A then opens to allow the flow of slurry to come into tank body A, thereby pushing gas out of the tank body and through a blower in the energy recovery system described later. Tank A is allowed to fill with slurry, and when it is completely filled the pressure in tank A is equal to the pressure in line 14 on the opposite side of valve 24. When these pressures are equal, the rotary valve closes under no duress since it is experiencing equal pressures on both of its faces. A gas (such as air or inert gas) is then induced into tank A at approximately 500 psi. The gas acts as a piston to increase the pressure inside pump A. When the pressure inside the tank equals the pressure on the downstream side 16 of tank A, exhaust valve 30 opens under no duress and the slurry in tank A exits from tank A into exhaust line 16.

While tank A is pumping out the slurry, tank B is filling. Inlet valve 24 of tank B opens when pressure inside tank B equals the pressure in inlet line 14 so that inlet valve 24 opens under no duress. After tank B is filled, rotary valve 24 closes under no duress since the pressure on both of its faces will be the same. Motive gas is then induced into tank B. Then, as tank A nearly finishes exhausting the slurry in it, the exhaust valve 30 of tank A closes while the exhaust valve 30 of tank B simultaneously opens. The simultaneous opening of the exhaust valve on tank B and closing of the exhaust valve on tank A assures a continuous stable flow of slurry in the pipeline.

While tank B is pumping out its slurry, tank C is filling. Once again, the inlet valve 24 of tank C opens when the pressure on both of its faces is equal, thereby allowing tank C to fill with slurry. Since the pressure on both faces of inlet valve 24 of tank C is the same, valve 24 opens under no duress. Then as pump B pumps out to nearly empty, the exhaust valve of pump B closes simultaneously with the opening of exhaust valve 30 of tank C and a transition is made to tank C.

The primary advantage of the pumping structure described above is that particles of coal having an eight to twelve inch diameter can be pumped without turbulence. Use of a plurality of tanks in sequence assures continuous flow of slurry through the pipeline. If one of the tanks (A, B or C) malfunctions, the spare tank comes online. The spare tank (the top one shown in FIG. 3) is filled only with vehicle, and will be ready at all times to take its place in the pumping sequence should one of the tanks or its valves fail.

The inlet and outlet valves can easily be automated to assure the sequence of openings and closings described above. Sensors in the tanks and lines can sense pressures on both faces of the rotary valves to determine when the valves should open and close. Such devices are well known.

Since tank 12 is tilted, and exhaust line 16 is lower than inlet line 14, no air or gas will enter the pipeline. This is an advantage since the presence of air or gas in the pipeline will reduce the efficiency of the system by causing energy to be expended on compression of gas in the pipeline instead of using the energy to move the slurry.

The opening and closing of rotary valves under no duress allows the valves to be operated under balanced conditions requiring little energy and resulting in little wear on the valves.

An additional aspect of the valve is that the gas used for pumping is introduced into tank 12 until the slurry in the tank reaches a level slightly above its bottom fluid level. The incoming gas is then shut off, and the gas in tank 12 is allowed to expand to push down the fluid level further and thereby consume potential energy in the gas. The gas is never allowed to expand to such an extent that it passes through any of the orifices 40 or enters the pipeline.

Another advantage of the structure shown in FIGS. 2 and 3 is that rotary valves 24, 30 are compact, modular structures that can be quickly removed and replaced should they malfunction.

The reducing nipples 22, 36 are necessary because the diameter of the slurry pipeline is less than the diameter of the pipeline containing the rotary valves. The reason for this difference in diameter, which will become more apparent during the following detailed discussion of the rotary valves, is to permit slurry to flow through the valves and pump body lines without interfering with the flow.

The pump described above has an approximately eighty-five percent efficiency, in comparison to the approximately sixty percent efficiency of conventional rotary and piston pumps. The ability of the present pump to prevent oxygen from entering the pipeline also reduces the likelihood of oxidation of the polymer lubricant. The great reduction of turbulence usually encountered in conventional pumps also increases the usable lifetime of the polymer as well. Preventing the entry of air into the pipeline also increases the siphoning effect from occurring even over undulating terrain.

Figure 4:
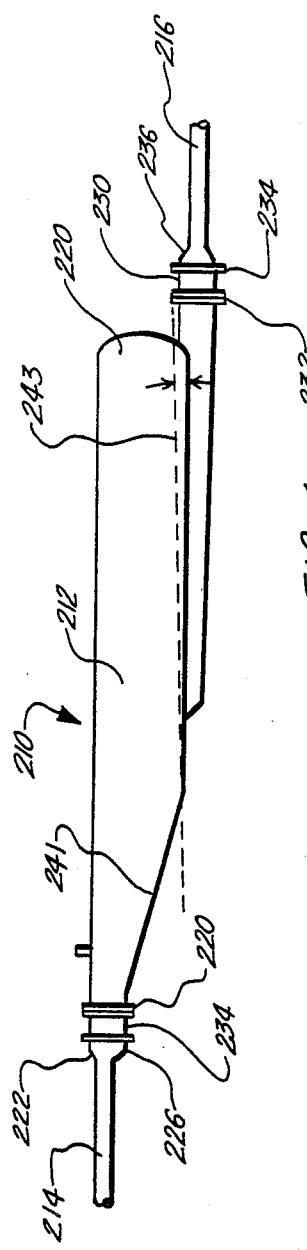
FIG. 4 is a side view of a second embodiment of the pumping body shown in FIG. 2, the inlet end of the pumping body being tapered to provide an inclined surface over which the slurry flows, the tilt of the pumping body being illustrated with a phantom line.
Figure 4A:
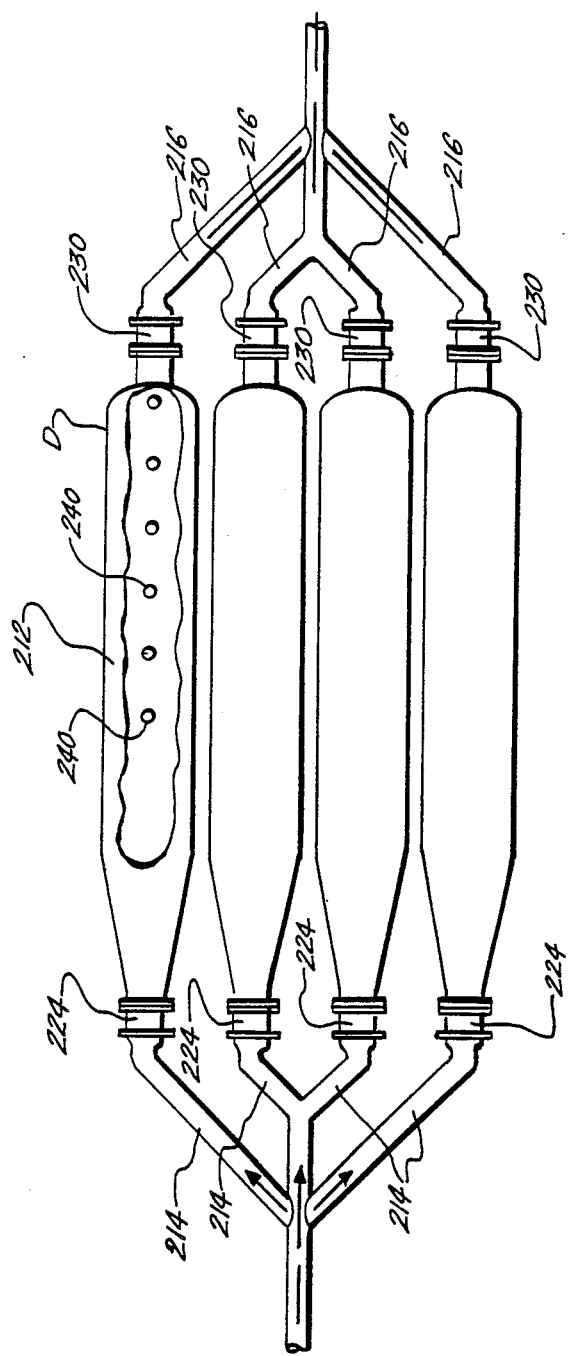
FIG. 4A is a top view of a plurality of tanks like that shown in FIG. 4.

An alternate embodiment of the pump is shown in FIGS. 16-17 wherein like parts have been given like reference numerals plus 200. The tank 212, however, is provided with a tapered inlet end which provides a sloped surface 241 (FIG. 4) down which the slurry flows. Phantom line 243 also illustrates that the outlet end of tank 212 is lower than the inlet end.

IV. Energy Recovery System

Figure 5:
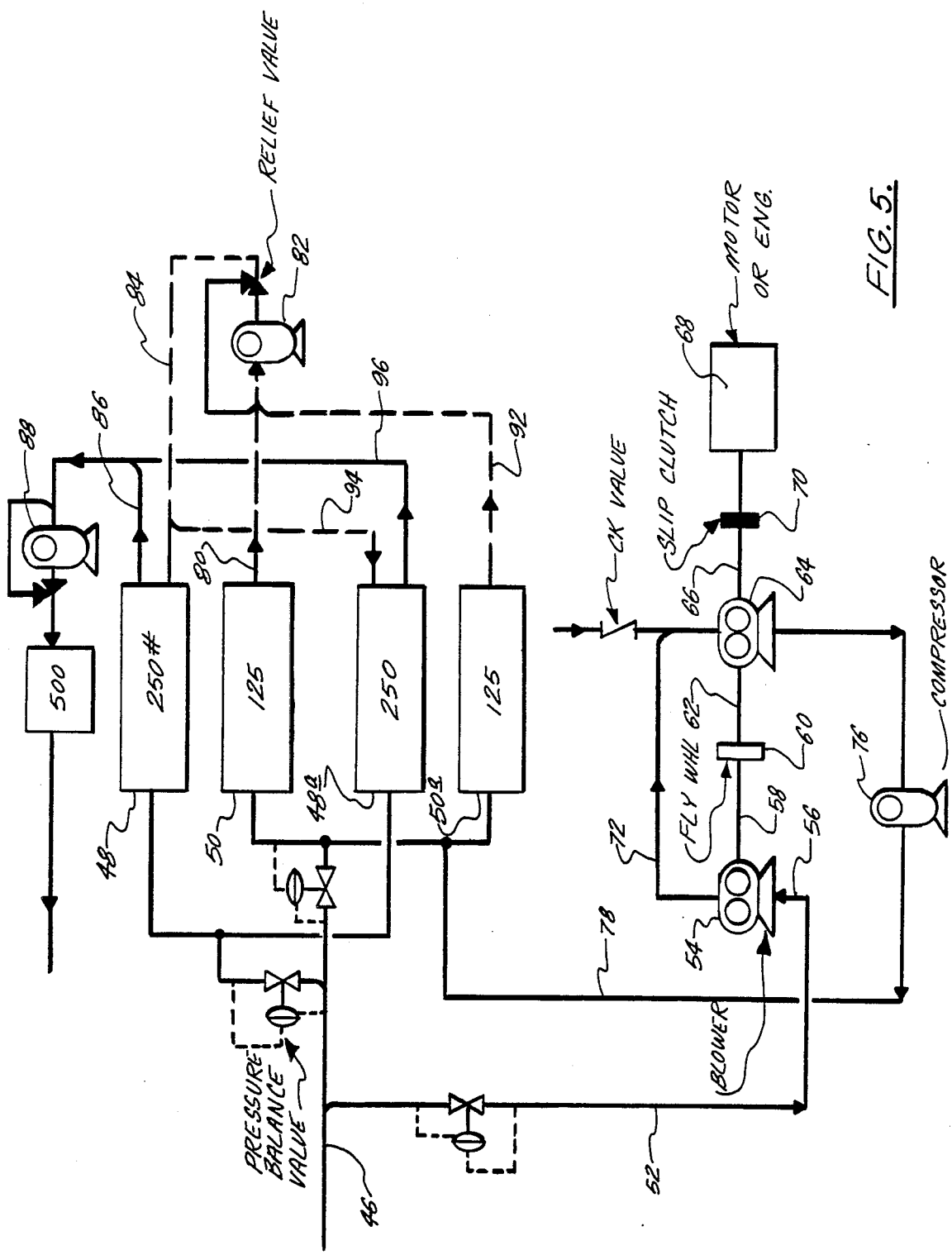
FIG. 5 is a schematic drawing showing the operation of the energy recovery system of the present invention.

FIG. 5 is a schematic diagram which shows the energy recovery system that allows air to be compressed for use in the pumps for only about forty percent of the horsepower that would otherwise be required. The energy recovery system takes advantage of the principle that most of the energy required for the compression of air is required for its initial compression. In other words, air which is already compressed can be further compressed to a desired pressure for much less energy than would be required for compressing a gas from its uncompressed state to the same desired pressure. The potential energy of pressurized gas can accordingly be recovered as part of the present invention since it uses a motive gas piston.

The energy recovery system of FIG. 5 operates in the following fashion. Once the slurry has been exhausted from tank 12, the compressed gas inside tank 12 is at, for example, about 500 psi. An exhaust line 44 (see FIG. 2) contains a valve which then opens to establish fluid communication through line 46 (FIG. 5) with storage tank 48 which is of the same dimensions as pump body 12. Compressed gas in tank 12 moves through line 46 to storage tank 48, the gas now occupying an area twice as large as it originally occupied, thereby reducing the pressure in pump body 12 and tank 48 to 250 psi in each of tank 12 and tank 48. The port to tank 48 then closes and a secondary port opens, allowing fluid communication between line 46 and storage tank 50 which is of the same dimensions as pump body 12. Since the pressure in tank 12 is now at 250 psi, gas flows through line 46 and into tank 50, the gas occupying twice the area that it previously occupied thereby reducing the pressure in each of tank 12 and tank 50 to 125 psi.

The second set of tanks, 48a, 50a is filled by the tank which empties subsequent or prior to the pump body which fills tanks 48, 50.

At this point, inlet rotary valve 24 opens and tank 12 is filled with new slurry which displaces the remaining gas in tank 12 and exhausts it through line 52 into the exhaust side of a blower 54. (Blower 54 is being operated with a positive pressure on its inlet). A governor 56 is located between line 52 and blower 54 to control the size of the orifice through which the exhaust gas moves from line 52 into blower 54. The orifice of the governor enlarges to meet the demand to maintain blower speed.

The blower 54 is connected through a common axle 58 to a flywheel 60. Flywheel 60 is similarly connected through a common axle 62 to a smaller secondary blower 64, which is in turn connected through a common axle 66 to an idling motor 68. A slip clutch 70 is provided between axle 66 and motor 68.

As exhaust moves through line 52 and into blower 54, the blower turns axles 58, 62, 66 and flywheel 60 as well as blower 64. The gas that moves through blower 64 enters line 72 and is recycled through blower 64 into line 74 whence it moves to compressor 76 into line 78 and then to tank 50 or 50a. (Tanks 48a, 50a have been filled respectively to 250 psi and 125 psi by the pump tank which came online prior or subsequent to the filling of tanks 48, 50).

The gas in tank 50 then moves through line 80 to compressor 82 where it is compressed and then moved through line 84 to tank 48. The gas in tank 48 then moves through line 86 to another compressor 88 to bring it back up to 500 psi in a tank 90 which is somewhat smaller than the tanks 48-50.

Similarly, the gas in tank 50a moves through line 92 to compressor 82 and is returned through line 94 to tank 48a to increase the pressure therein. The gas then moves from tank 48a through line 96 to compressor 88 and thence into tank 90. In this fashion, a three stage compression is achieved which is much more energy efficient than a single stage pressurization of a tank from 0 psi to 500 psi.

The rotational inertia of flywheel 60 in FIG. 5 permits the blowers 54, 64 to continue rotation for a prolonged period of time. The blower 54 may be pulling a vacuum, which will help it continue to rotate. When it does go below a certain angular velocity, however, slip clutch 70 will engage motor 68 so that blower 54 will continue to idle at a pre-selected minimum speed. The idling of blower 54 is energy efficient since much of the energy required to turn the blower must go into overcoming the rotational inertia of the blower in starting its initial movement.

The savings of energy brought about by the energy recovery system can be illustrated by the following calculations. It is known that 0.314 hp per cubic foot is required to compress air from atmospheric pressure to 500 psi. Yet only 0.246 hp per cubic foot is required to compress air from 0 to 250 psi. This means that 0.246/0.314=0.7834 or 78.34 percent reduction of horsepower needed to compress the gas from 250 to 500 psi as opposed to 0 to 250 psi. In other words, only twenty percent of the energy is required.

It is known that 0.185 hp per cubic foot of air is required to compress air from 0 to 125 psi. Therefore, 0.1845/0.314=58.8% savings or only 41.2% of the energy is required as would be required to compress the gas from 0 to 500 psi.

If the energy savings of each of the stages is added together, a total savings of approximately sixty percent of the otherwise required horsepower is achieved per pumping station. The total savings in energy should be calculated by multiplying this savings by the number of pumping stations being used.

V. Rotary Valve

The pump described in Section III above uses a special rotary valve. One embodiment of such a valve is shown in U.S. Pat. No. 4,328,831 issued to Robert C. Wolff in 1982, the disclosure of which is incorporated by reference. Since these valves can be understood by reference to U.S. Pat. No. 4,328,831, they will not be described in detail.

Figure 6:
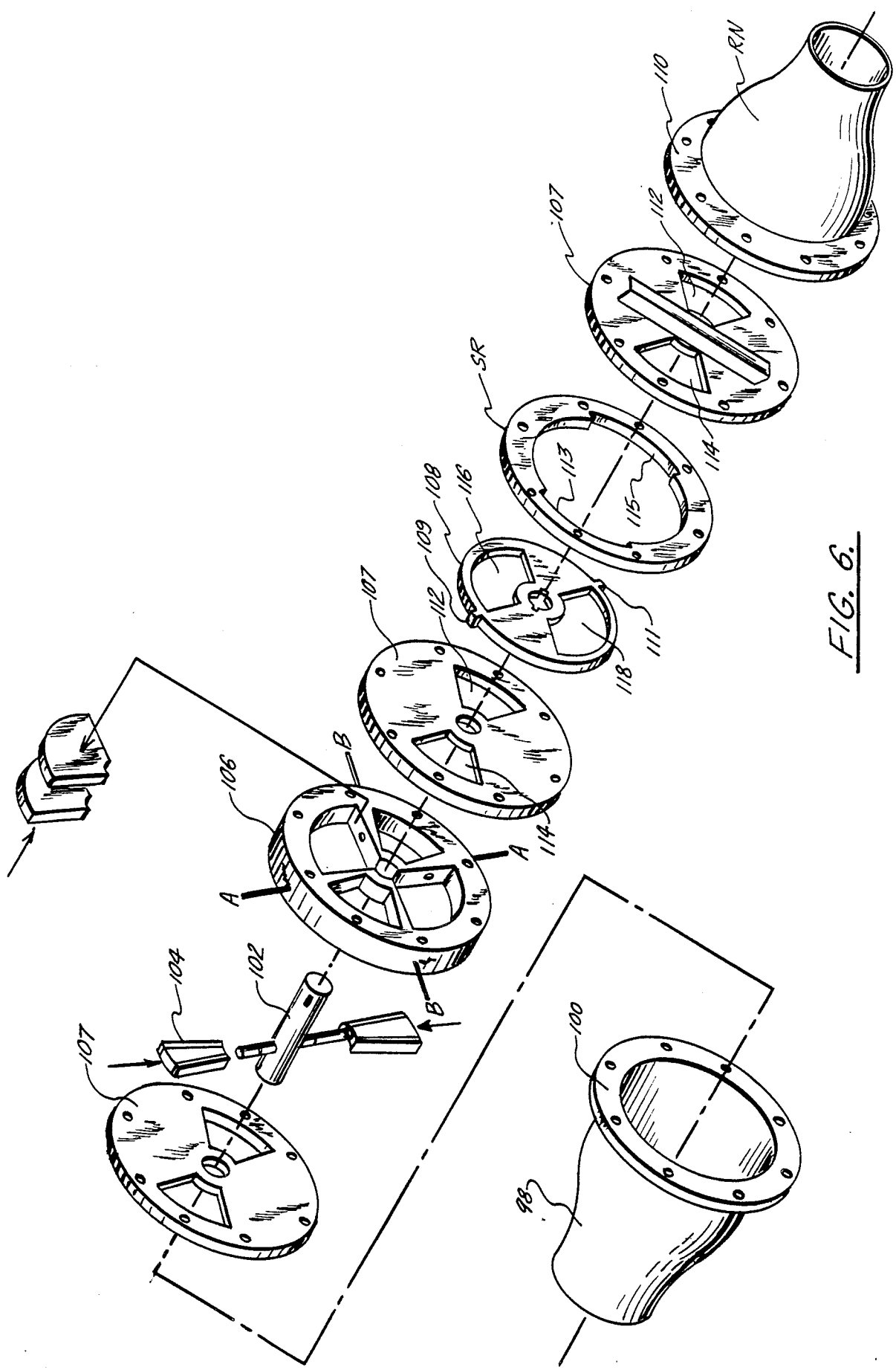
FIG. 6 is an exploded perspective view of an embodiment of the rotary valve.

An improved version of the valve is shown in FIG. 6. That valve is comprised of a pipeline 98, flange 100, shaft 102, plates 107, valve activator 104, activator chamber member 106, paddle 108, spacer ring SR, flange 110 and reduction nipple RN. Those parts in FIG. 6 which have holes around the periphery are bolted together through the holes. Shaft 102 is common to all those parts having a central aperture, the shaft 102 being keyed to activator 104 and paddle 108 for rotation in unison.

Each of parts 107 is provided with pie shaped cutaways 112, 114. Chamber member 106 is divided into quadrants by perpendicular members carried in the interior of member 106. Hydraulic or pneumatic lines A-A and B-B are provided for introducing fluid into two of the quadrants comprising the interior of member 106. Member 106 is shown in greater detail in FIG. 7.

Paddle 108 is provided with pie-shaped openings 116, 118, the diameters and angular dimensions of which are greater than the diameters and angular dimensions of openings 112, 114. Paddle 108 has an outer diameter less than the outer diameter of members 107. A pair of diametrically opposing stops 109, 111 are formed around the periphery of paddle 108, stop 109 slides within recess 113 of ring SR while stop 111 slides within recess 115. Paddle 108 turns on shaft 102 from a closed position (shown in FIG. 6) to an open position in which openings 112, 114 are aligned with openings 118, 116.

Figure 7:
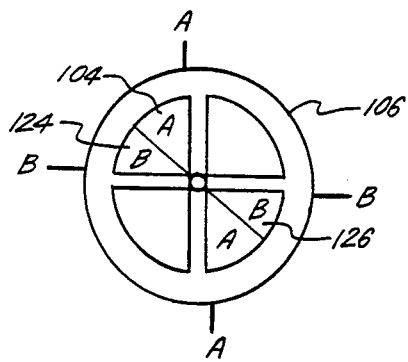
FIG. 7 is an end view of the chamber member which actuates movement of the paddle to open and close the rotary valve.

The operation of the valve actuator is better understood by reference to FIG. 7 which shows activator 104 rotatably disposed within chamber member 106 for movement through an approximately 90° angle in each of quadrants 124, 126. Placement of activator 104 in chamber member 106 further divides each of quadrants 124, 126 into sub-chambers A and B. Since chamber member 106 is sealed on both sides by members 107, four essentially closed chambers (two A's and two B's) are created. When hydraulic or pneumatic fluid is introduced through lines B; the chambers B in each of quadrants 124, 126 are filled with approximately five psi. The equal and opposite forces exerted on activator 104 on opposite sides of the pivot point turn activator 104 in a clockwise direction in FIG. 7. Similarly, introduction of five psi of pressure through lines A-A fills chambers A and moves activator 104 in a counter clockwise direction in FIG. 7.

Since activator 104 and paddle 108 are both keyed to common shaft 102, movement of activator 104 through a quadrant 124 or 126 of member 106 also moves paddle 108 through approximately a 90° angle. The parts of the valve shown in FIG. 6 are aligned and and oriented so that the valve will be closed when the parts are in the relative positions shown. When, however, activator 104 is moved through a quadrant by the introduction of pressure through lines A-A, paddle 108 will similarly be moved until openings 116, 118 align respectively with openings 114, 112. The extent of movement of paddle 108 is controlled by stops 109, 111, thereby assuring perfect alignment of the openings in paddle 108 and members 107.

Figure 8:
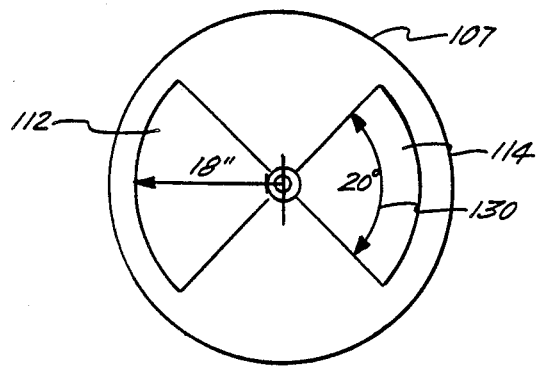
FIG. 8 is an end view of one of the stationary plates against which the rotating paddle slides.

The reduction nipple RN is necessary adjacent the rotary valve because the rotary valve body is approximately 1-⅝ larger in diameter than the pipline. This enlargement of diameter is necessary so that area of cutouts 112, 114 of elements 107 can together at least equal the full cross-sectional area of the pipeline through which the slurry moves. This permits movement of slurry through the rotary valve without reduction in flow. Typical dimensions of member 107 are shown in FIG. 8 for a typical thirty-six inch valve in a twenty-four inch pipeline. The radius r is about 18 inches. Line 130 represents the center of gravity of member 107, and a typical length of line 130 is approximately 20 inches. These dimensions would pass eight inch lumps of coal even if the lumps were passing paired through the opening.

It should be noted in FIG. 7 that slots 112, 114 are aligned substantially horizontally, one next to another. Although a vertical, one on top of the other arrangement is possible, it has been found that a side by side arrangement is better since pieces of coal do not need to be directed up or down to move through the valve. The rotary valve works in combination with the reduction-/expansion nipple RN which is shown in greater detail in FIG. 6A.

Figure 6A:
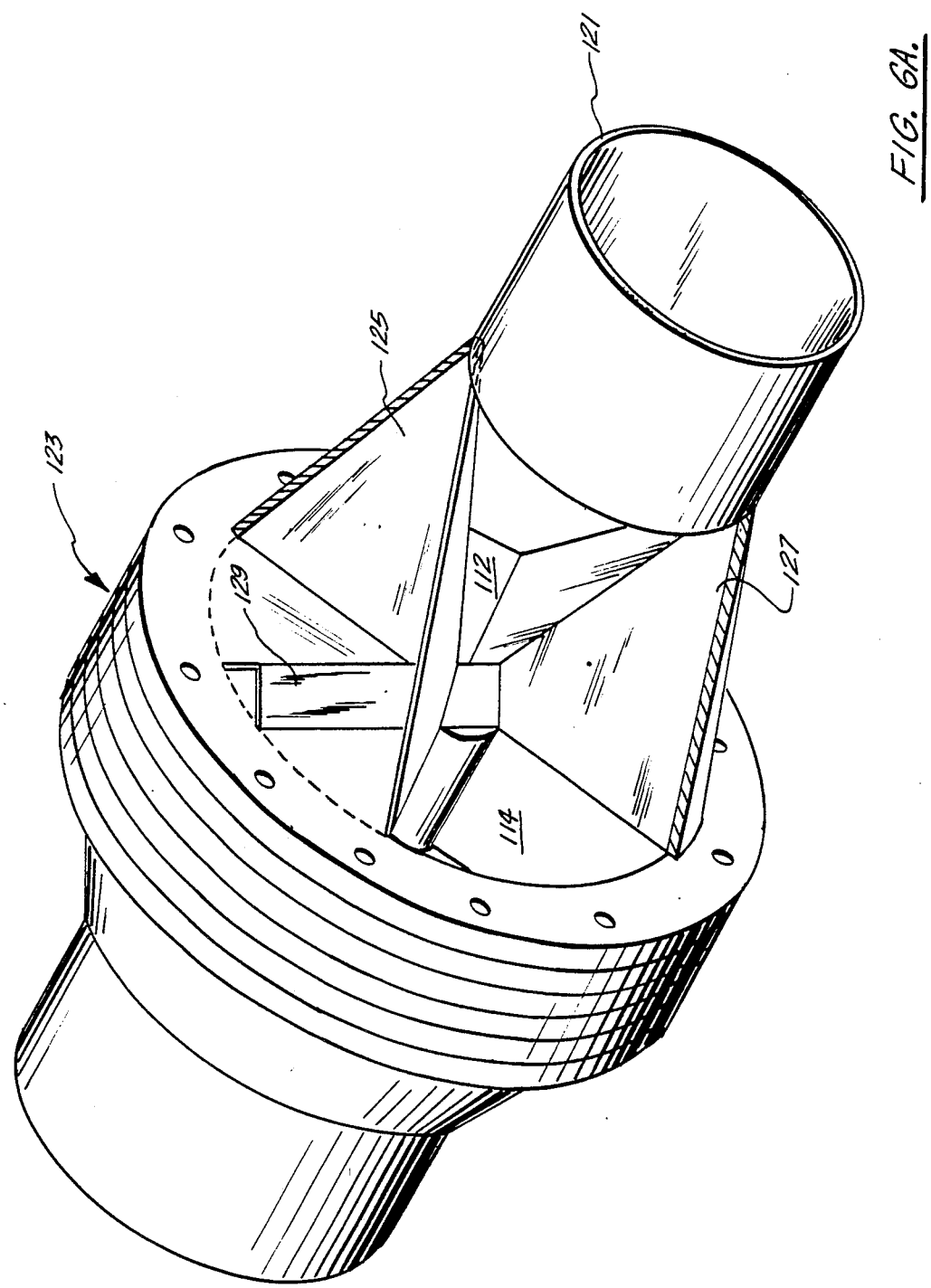
FIG. 6A is an enlarged perspective view of the reduction nipple for the rotary valve.

As seen FIG. 6A, the reduction nipple RN is comprised of a twenty-four inch pipe 121, thirty-six inch rotary valve 123, and two opposing, V-shaped guides 125, 127, each of which form half of a pyramid. The valve is further reinforced by a V-shaped reinforcement bar 129 that runs vertically across the diameter of member 107.

One of the obvious advantages of the valve shown in FIGS. 6–8 is that it is self-sealing in either direction, depending on the face of the valve on which pressure is being exerted. The portions of paddle 108 which are not cut out overlap the cut out portions 112, 114 of member 107. Paddle 108 is balanced between members 107, and pressure exerted against paddle 108 from either side will seal paddle 108 against one or the other of members 107. This makes it ideal for use in the slurry pump wherein pressure is being alternately exerted on the opposite faces of the valve.

Paddle 108 is always in balance since it freely rotates within spacer ring SR between plates 107. (Gaskets are provided between paddle 108 and members 107 and provide clearance for rotation but are not shown in FIG. 6). Since paddle 108 is balanced, there is minimal wear on the shaft and minimal torque is required to turn paddle 108. The built in stops provided by stops 109, 111 result in a perfect sealing of the valve in both the open and closed position by permitting an accurate alignment of the cutaway portions 112, 114 of member 107 with the portions of paddle 108 that are not cut away. Similarly, complete opening of the valve is assured.

The valve is self-cleaning since the overlap between paddle 108 and openings 112, 114 in members 107 prevent particles from being trapped between them. The valve is also self-cleaning since paddle 108 wipes against members 107 when the valve opens and closes.

The primary advantages obtained by use of such a valve in the present pumping system is that a pressure tight seal is achieved on either side of the valve depending on the direction from which the pressure is coming. The valve also cleans itself and permits eight inch chunks of coal to pass through even if paired. The embodiment of the valve shown in FIGS. 6–8 is superior even to that shown in U.S. Pat. No. 4,328,831 since it is completely self-contained (and does not require an external structure to operate it) so that it can be more easily replaced as a modular unit if the necessity arises.

The rotary valve shown here is in all respects superior to a gate valve which encounters problems in seating when closing a pipeline filled with particulate matter. The rotary valve, if it encounters a lump of coal when closing, simply crushes the coal and continues to close.

VI. Mixing Valve

Figure 9:
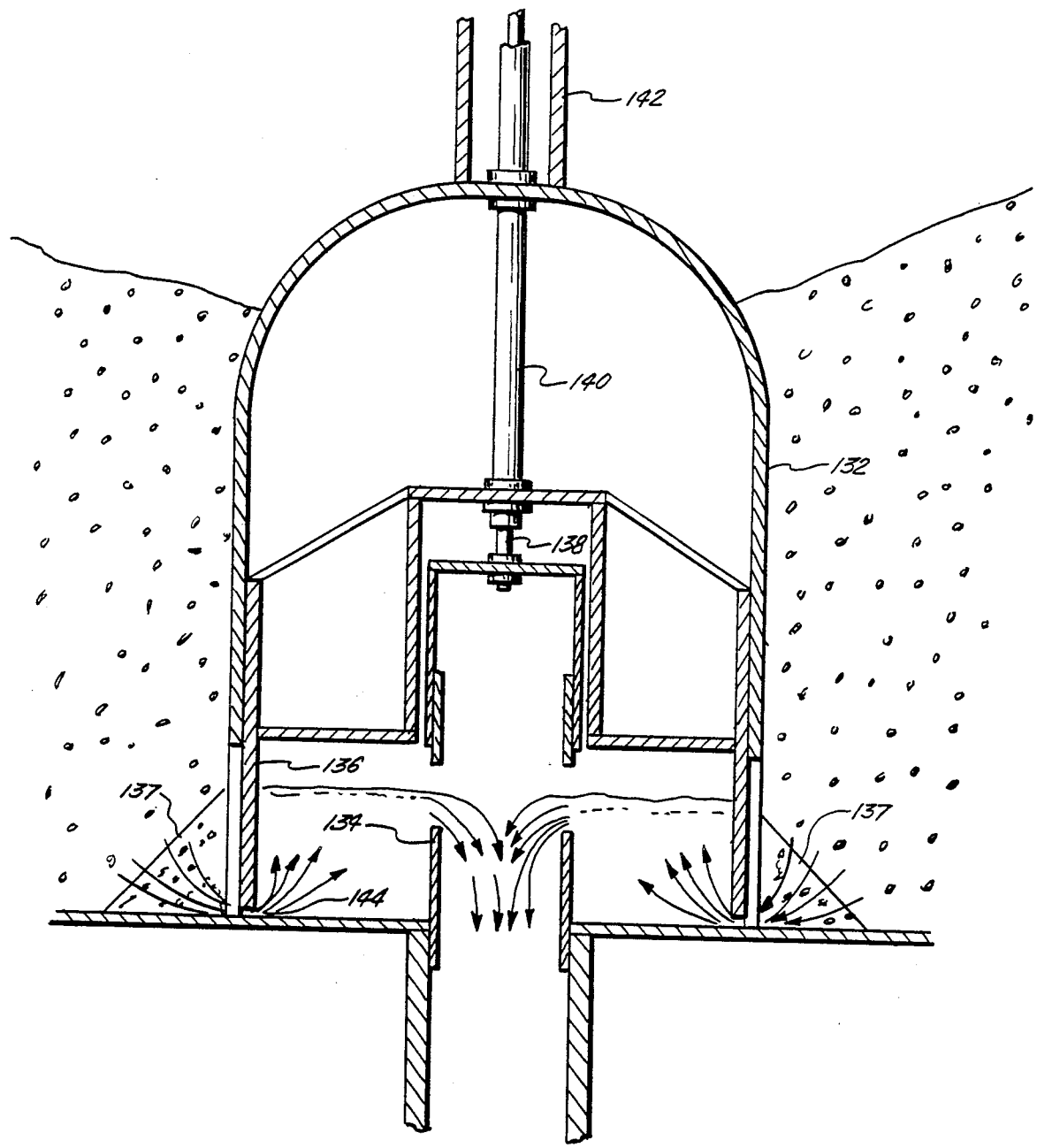
FIG. 9 is a cross-sectional view of a first embodiment of the mixing valve showing the outer skirt in a substantially closed position and the inner skirt in an elevated position, the arrows showing the pathway of fluid flowing from the surrounding stockpiling chamber into the mixing valve and out the discharge orifice to drain vehicle from the coal.
Figure 10:
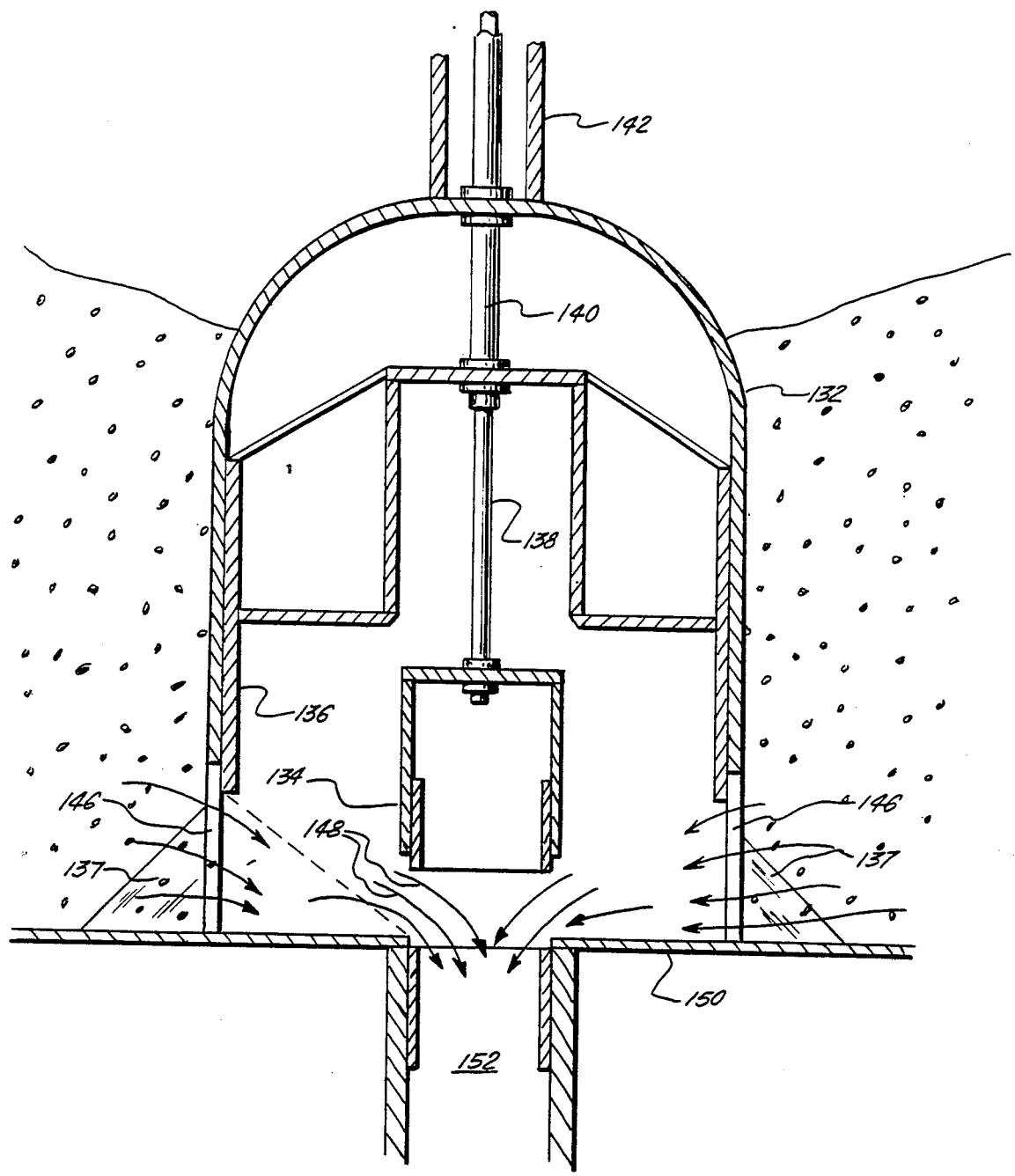
FIG. 10 is a view similar to FIG. 9 showing the outer skirt in a raised position and the inner skirt in a lowered position for mixing of the coal and vehicle.

Another important aspect of the pumping system is a mixing valve which permits the vehicle to be drained off the coal while leaving the coal fines behind, and also permits the coal to be mobilized or remobilized in the automatic 30:70 by weight ratio of vehicle to coal. A simplified view of the mixing valve is shown in FIGS. 9 and 10. FIG. 9 shows the mixing valve in its draining mode for removing the vehicle from the coal. FIG. 10 shows the valve in its mixing mode wherein the coal is being suspended in the vehicle and sent to a pump. Portions of the valve are disclosed in U.S. Pat. No. 4,384,704 issued to Robert C. Wolf, the disclosure of which is incorporated by reference.

Turning in more detail to the parts of the valve, it is comprised of a dome-like stationary housing 132 having a movable inner skirt 134 and outer skirt 136. Housing 132 is supported by three legs which are reinforced with gussets 137, the legs providing three openings around the exterior of housing 132 adjacent floor 150 of the compartment. The inner skirt 134 is moved up and down by means of an inner shaft 138 while the outer skirt is moved up and down by an outer shaft 140. The outer shaft 140 is hollow and inner shaft 138 runs longitudinally through the interior of outer shaft 140. A cylindrical shaft housing 142 protects the inner and outer shafts from contamination by particulates and resulting friction.

Turning now to FIG. 9 in detail, the draining mode of the valve is shown in which outer skirt 136 is lowered to provide only a restricted opening 144 around the exterior of the mixing value. In preferred embodiments, the surface area exposed around the exterior of outer skirt 136 (i.e., the area of opening 144) is sixty percent of the cross-sectional area of the pipe through which coal and vehicle are being introduced into the container surrounding the mixing valve. Since less than thirty percent of the cross-sectional area of the inlet pipe is carrying vehicle, the sixty percent opening 144 will be greater than the cross-sectional area of the pipe through which the coal and vehicle are being introduced. This greater area of opening 144 will reduce the velocity of the vehicle in the vicinity of the mixing valve. As the velocity of the vehicle is reduced, it loses its ability to suspend and transport particulates such as fines. As a result, most of the particulates will fall out of the vehicle before moving into the area of the mixing valve.

If any fines remain in the vehicle after it moves into the mixing valve, they will be filtered out by the baffle effect which is created by the raised inner skirt 134 (see FIG. 9). Since fluid is only being drained off of the top of the fluid level, the fines will tend to fall out of the vehicle. The result is that the vehicle being discharged from the mixing valve is quite clear.

The polymer lubricant also reduces adhesion between the vehicle and coal. The result is that the solid and liquid can be dramatically and completely separated by the mixing valve. Water emerging from the valve appears to have been filtered, greatly reducing the incidence of pollution and enhancing recovery of all solid product.

FIG. 10 shows the mixing valve in its mixing mode wherein outer skirt 136 is raised to expose openings 146 and inner skirt 134 is lowered so that opening 148 is below the tangency of the level of floor 150. The angle alpha shown in FIG. 10 is the angle of elevation between the periphery of the discharge opening 152 and the bottom of outer skirt 136. This angle alpha is less than the angle of repose of the ocal surrounding the mixing valve. As a result, the surrounding dry coal will not move into discharge opening 152 while the coal is dry. However, once the vehicle is induced into the container which contains the mixing valve, the angle of repose changes as the coal is fluidized and moved through the valve into discharge opening 152. Mixing of the coal and vehicle in this fashion allows one to automatically obtain the proper volume of vehicle if the valve is open to slightly less than the angle of repose.

Inner skirt 134 has an opening 148 that extends to slightly below the level of floor 150. All of the coal in the compartment surrounding the mixing valve will move through discharge opening 152.

Figure 11:
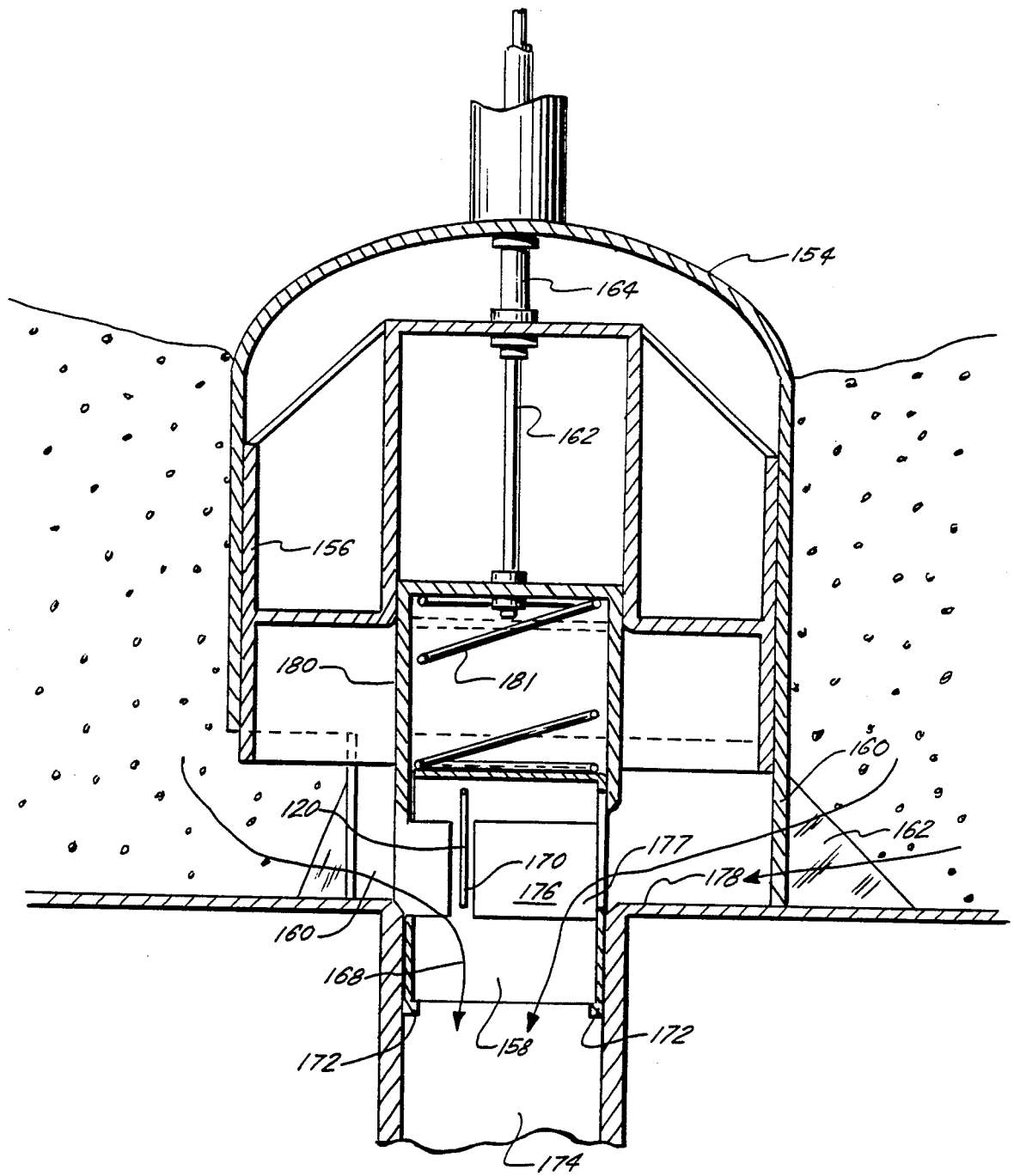
FIG. 11 is a cross-sectional view of a second embodiment of the mixing valve having a reduced profile, the valve being shown in the mixing mode.
Figure 12:
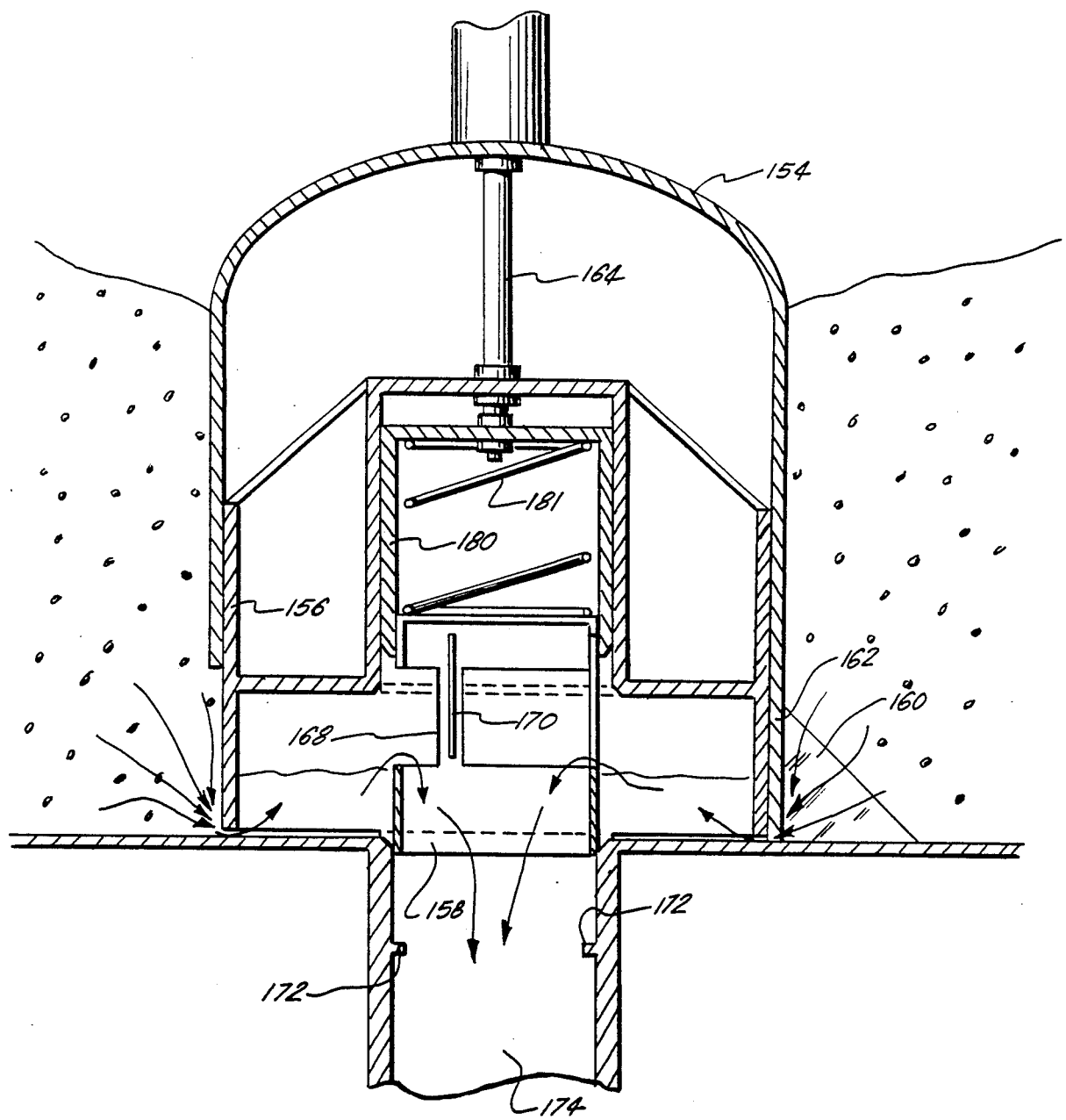
FIG. 12 is a view of the valve in FIG. 11, the positions of the outer and inner skirts having been changed to their draining mode positions.
Figure 12A:
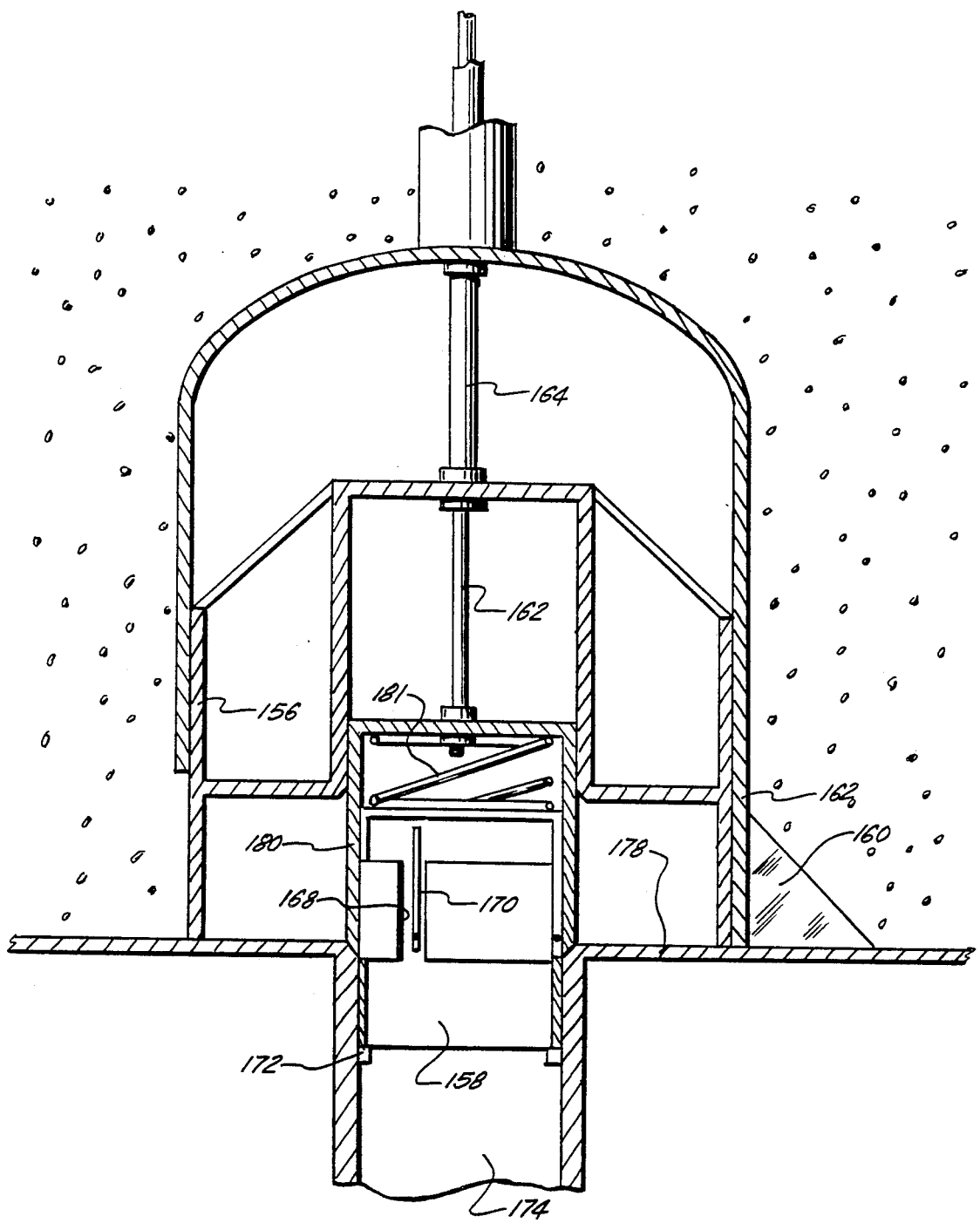
FIG. 12A is a view of the valve in FIG. 12, except the valve has been shifted to a sealed mode to close the valve.
Figure 13:
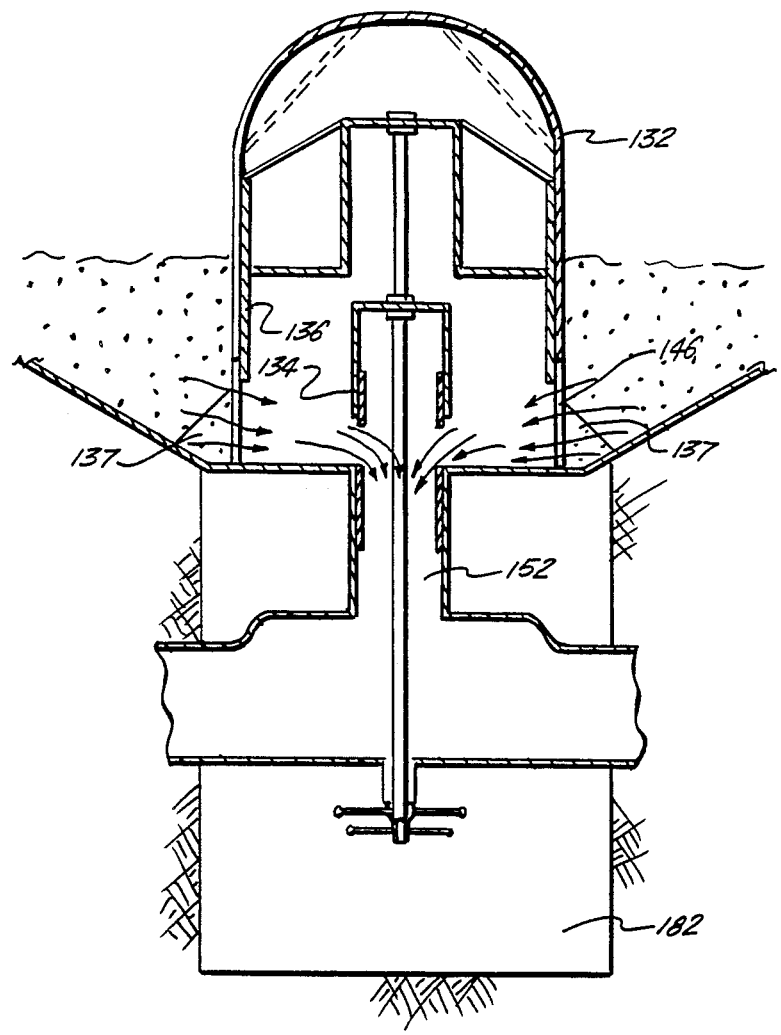
FIG. 13 is a third embodiment of the mixing valve which is operated from below the stockpiling structure.

Another embodiment of the mixing valve is shown in FIGS. 11–13 wherein FIGS. 11, 12 and 12A are cross-sectional views of a mixing valve having a reduced profile, and FIG. 13 is a view of an alternate embodiment of the mixing valve which is operated from below the valve. The dome shaped outer housing 154 of the mixing valve in FIG. 11 is provided with an outer skirt 156 and inner skirt 158. Housing 154, is provided with three legs 160 (only two of which are shown in FIG. 11). Each of legs 160 is reinforced with a gusset 162 to stabilize the mixing valve. Inner skirt 158 is provided with three vertical strips 168 (only one of which is shown in FIG. 11) each of strips 168 being in alignment with a corresponding leg 160, the strips defining openings 176 therebetween. Slots 170 are provided on each of strips 168, and retainers carried by intermediate skirt housing 180 fit into slots 170 to maintain strips 168 in alignment with legs 160 and diminish any interference with flow into inner skirt 158. A stop 172 is also provided in discharge line 174 to provide a limit beyond which inner skirt 158 cannot be depressed. As can be more quite clearly in FIG. 11, the bottom of opening 176 in inner skirt 162 defines a flow retaining lip 177 which is below the surface of the floor 178 to provide a lowest point to which all material in the container surrounding the mixing valve will drain during a cleanup or mixing operation.

An intermediate skirt 180 circumscribes inner skirt 158 and can be moved down around it to provide a fluid tight seal at the deck. A spring 181 carried within skirt 180 normally biases skirt 180 out of closing engagement with discharge orifice 174. In all other respects the operation of the mixing valve shown in FIG. 11 is similar to that shown in FIGS. 9–10. FIG. 12A shows the mixing valve in a sealed position with both sherts 156 and 180 in a sealed position against floor 178.

FIG. 13 shows yet another embodiment of the mixing valve in which the valve is operated from underneath instead of above the dome shaped outer housing. A tunnel 182 is provided underneath the valve to provide access for installation and maintenance. The operation of this embodiment is otherwise the same as in FIGS. 9–10.

In summary, the advantages of the mixing valve are that it permits coal and vehicle to be automatically mixed in the desired proportions either at the point of origin of the slurry pipeline or at remobilization points. The vehicle can be easily removed at termination points by operating the valve in the draining mode to produce a virtually pollution free vehicle discharge which can be recycled for use at the upline pumping stations. The effectiveness of the mixing valve in removing the vehicle from the coal is especially enhanced by the presence of the polymer in the vehicle which prevents the vehicle from adhering to the coal, thereby quickly providing a virtually dry coal when the valve is operated in its draining mode.

VII. Inert Gas Generator

An inert gas generator is also used for producing a gas having approximately 5% oxygen content as a by-product of exhaust from engines used in compressing gas for use in the pump described in Section III. The result is an inert gas which cannot ignite because it lacks sufficient oxygen for combustion. Similarly, reduction of oxygen content reduces the possibility of harmful oxidation in the pump or degradative oxidation of the Polyox ® polymer.

Another advantage of a inert gas such as carbon dioxide is found in the ability of $CO_2$ to act in a manner similar to the polymer lubricant in reducing friction in the pipeline. The $CO_2$ in the inert gas will liquify when pressurized to about 300 psi, and some of this liquid will mix the slurry when the inert gas is introduced into the pump body. The $CO_2$ can then reduce friction between the slurry and pipeline walls. In some embodiments carbon dioxide gas can be used as the gaseous piston, and the amount of polymer lubricant can be reduced or eliminated altogether.

VIII. Stockpiling Structure

A stockpiling structure is shown in FIGS. 14–15, the structure being in the form of a plurality of adjacent inverted pyramids below the level of ground 184. The four faces of the inverted pyramid make an angle with the horizontal, thereby providing a surface over which the coal readily moves downwardly. A mixing valve 186 is located at the apex of the inverted triangle adjacent access tunnel 188. Mixing valve 186 regulates the flow of material from the interior of the stockpile structure into line 190.

As seen in FIG. 14, a row of a ten adjacent stockpiling structures having dimensions of 200 ft.×200 ft. is provided. An idential row of ten stockpiling structures is parallel and adjacent to the first row. Fluidized coal from each of the squares flows through feeder lines 192 into collecting lines 194. From the collecting lines the fluidized coal flows into pump lines 196 whence the coal is conveyed to the pump. Once the coal flows to the pump, it can then be pumped to any desired destination using the pumping system discussed above.

Each square is filled from the outlet end of the slurry pipeline which is suspended from an overhead crane. The crane moves the outlet from square to square until each is filled. A transducer senses the height of the pile of coal as it accumulates in each square, and as the pile grows higher the pipe moves higher as well. As the height of the outlet rises, additional pressure is required to pump it out of the outlet. The pressure at the most previous booster pump in the slurry line can be altered through automation to accommodate the changing pressure requirements of the pipe at the terminus as the height of the coal piles varies.

The coal in the stockpile is fluidized by introducing water into each of the squares from above, and the slope on the faces of each of the inverted pyramids promotes removal of all of the coal.

Use of mixing valve 186 in the stockpiling structure permits the coal to be easily stored by draining the vehicle off and then remobilized by the addition of vehicle. The coal can be remobilized for purposes of transshipment though another pipeline or movement to ships or other modes of transportation.

An advantage of stockpiling the coal before loading it into a ship is that coal can be unloaded from the stockpile simultaneously with introduction of coal from the slurry pipeline into a transshipment vehicle. This would reduce the time required for loading a ship, barge, etc.

Storage of coal in mine run size instead of 200 mesh particles also prevents loss of product by wind attrition, and eliminates the necessity of centrifuging.

Conclusion

The system described herein provides a method of pumping coal slurry which uses significantly less water and energy while simultaneously eliminating many of the problems of previous coal slurry transportation systems. An additional benefit to decreased energy losses is the recovery of the potential energy of the coal due to its source elevation usually being greater than its destination elevation. The pumps, mixing valves and rotary valves make the new system advantageous, versatile, and can eliminate initial capital outlay by a significant amount, approximately 75%.

I claim:

1. A method of transporting through a pipeline solid pieces having a diameter of more than two inches, the method comprising the steps of:
    placing the solid pieces in a Newtonian vehicle having a specific gravity substantially similar to the specific gravity of the solid pieces to inhibit settling of the solids; and
    pumping the large diameter solids and vehicle through the pipeline with a fluid piston pump.

2. The method of claim 1 further comprising the step of adding a lubricant to the vehicle for reducing friction.

3. The method of claim 2 wherein the solids have a diameter greater than six inches.

4. The method of claim 2 wherein the specific gravity of the vehicle is slightly less than the specific gravity of the solid.

5. The method of claim 2 further comprising the steps of:
providing a pumping tank in fluid communication with the pipeline through an inlet and an outlet;
allowing the vehicle and solids to enter the pumping tank through the inlet while the outlet is closed;
closing the inlet, introducing fluid under pressure into the pumping tank and opening the outlet to allow the fluid under pressure to force the contents of the pumping tank into the pipeline; and
then closing the outlet before any of the fluid under pressure enters the pipeline.

6. The method of claim 5 further comprising the step of substantially completely separating by gravity alone the solids from the vehicle and lubricant then returning the vehicle and lubricant to the pipeline for reuse.

7. The method of claim 5 wherein the pumping tank is an elongated body in fluid communication with the outlet through a plurality of orifices in the bottom of the body.

8. The method of claim 7 wherein the outlet end of the tank is positioned lower than the inlet end.

9. The method of claim 5 further comprising the step of recovering the potential energy of the fluid under pressure in the pumping tank after the contents of the pumping tank have been forced into the pipeline.

10. The method of claim 9 wherein the potential energy is recovered by establishing fluid communication between the pumping tank and a first energy recovery tank after the outlet is closed to bleed the pressurized fluid to the first energy recovery tank, then compressing the pressurized fluid in the energy recovery tank to a higher pressure, then introducing the fluid which has been compressed to a higher pressure into the pumping tank to pump the vehicle and solids.

11. The method of claim 5 further comprising the step of establishing fluid communication between the pumping body and a first energy recovery tank after the outlet is closed to bleed the pressurized fluid to the energy recovery tank, then compressing the pressurized fluid in the energy recovery tank to a higher pressure, then introducing the fluid at a higher pressure into the pumping body to pump the vehicle and particulate matter.

12. The method of claim 11 further comprising:
closing off fluid communication between the pumping tank and first energy recovery tank;
establishing fluid communication between the pumping tank and a second energy recovery tank; and
introducing the fluid under pressure in the second energy recovery tank into the first energy recovery tank with a compressor before compressing the pressurized fluid in the first energy recovery tank to a higher pressure.

13. The method of claim 12 further comprising the steps of:
closing off fluid communication between the pumping tank and second energy recovery tank;
then opening the inlet from the pipeline into the pumping tank to allow the pumping tank to be filled andf forcing remaining fluid under pressure in the pumping tank out of the pumping tank through a first blower to rotate a blower element, the blower element being connected by a common axle to a second blower which intakes air from outside the system and combines it with air that passed through the first blower, the combined air from the first and second blowers being compressed and introduced into one of the energy recovery tanks.

14. The method of claim 13 further comprising the steps
of providing a flywheel which rotates with the common axle of the first and second blowers to provide rotational inertia.

15. The method of claim 14 further comprising the step of providing means for imparting torque to the common axle if rotation of a blower element of the second blower falls below a preselected value.

16. The method of claim 15 wherein a plurality of pumping tanks are provided which sequentially fill and empty their contents into the pipeline.

17. The method of claim 5 further comprising the steps of:
expelling vehicle and solids from the pipeline into a stockpiling structure having a bottom surface; and
separating the vehicle from the solids.

18. The method of claim 5 wherein the solids are pieces of coal.

19. The method of claim 18 wherein the solids are of a diameter greater than about six inches.

20. The method of claim 19 wherein the solids are eight to twelve inches in diameter.

21. The method of claim 5 wherein the lubricant is polyethylene oxide and the vehicle is comprised of water.

22. The method of claim 5 wherein the vehicle is comprised of a mixture of water and a salt, the salt being added to increase the specific gravity of the water to a specific gravity substantially equal to but slightly less than the specific gravity of the particulate matter.

23. The method of claim 22 wherein the particulate matter is coal and the vehicle has a specific gravity of about 1.30.

24. The method of claim 23 wherein the salt is calcium chloride.

25. The method of claim 5 wherein the pipeline is comprised of a plastic material.

26. A method of transporting solids through a pipeline, the method comprising the steps of:
placing the solids in a liquid vehicle having a specific gravity substantially equal to the specific gravity of the solids, the vehicle further comprising a lubricant for reducing friction;
providing a pumping tank in fluid communication with the pipeline through an inlet and an outlet;
allowing the vehicle and solids to enter the pumping tank through the inlet while the outlet is closed;
closing the inlet, introducing fluid under pressure into the pumping tank and opening the outlet to allow the fluid under pressure to force the contents of the pumping tank into the pipeline;
then closing the outlet before any of the fluid under pressure enters the pipeline;
then recovering potential energy of the fluid under pressure in the pumping tank after the contents of the pumping tank have been forced into the pipeline, the potential energy being recovered by establishing fluid communication between the pumping tank and a first energy recovery tank after the outlet is closed to bleed the pressurized fluid to the first energy recovery tank;

then closing off fluid communication between the pumping tank and first energy recovery tank;

then establishing fluid communication between the pumping tank and a second energy recovery tank;

then introducing the fluid under pressure in the second energy recovery tank into the first energy recovery tank with a compressor then compressing the pressurized fluid in the first energy recovery tank to a higher pressure; and then introducing the fluid in the first energy recovery tank into the pumping tank to pump to vehicle and solid.

27. The method of claim 26 further comprising the steps of:

closing off fluid communication between the pumping tank and second energy recovery tank; and then opening the inlet from the pipeline into the pumping tank to allow the pumping tank to be filled which forces remaining fluid under pressure in the pumping tank out of the pumping tank through a first blower to rotate a blower element, the blower element being connected by a common axle to a second blower which intakes air from outside the system and combines it with air that passed through the first blower, the combined air from the first and second blowers being compressed and introduced into one of the energy recovery tanks.

28. The method of claim 27 further comprising the step of providing a flywheel which rotates with the common axle of the first and second blowers to provide rotational inertia.

29. The method of claim 28 further comprising the step of providing means for imparting torque to the common axle if rotation of a blower element of the second blower falls below a preselected value.

30. The method of claim 29 wherein a plurality of pumping tanks are provided which sequentially fill and empty their contents into the pipeline.

31. The method of claim 30 wherein the inlet of each pumping tank is comprised of a rotary valve and the outlet of each pumping tank is comprised of a rotary valve.

32. The method of claim 31 wherein each rotary valve is comprised of a first stationary plate and a flat rotating paddle in face to face engagement with one another, the stationary plate and paddle each being provided with cutaway portions that are moved into aligned relationship to open the valve and moved out of aligned relationship to close the valve.

33. The method of claim 28 further comprising the steps of:

expelling vehicle and solids from the pipeline into a stockpiling structure having a bottom surface; and separating the vehicle from the solids in the stockpiling structure.

34. The method of claim 33 wherein the vehicle is separated from the solids with a mixing valve which is comprised of:

an annular stationary housing around a discharge opening defined by the bottom surface of the stockpiling structure, the stationary housing having an annular opening around the base thereof;

an annular outer skirt slidably disposed in contiguous relationship with the interior of the annular stationary housing, the outer skirt being movable between a first position in which it closes a substantial portion of the area of the annular opening around the base of the stationary housing, and a second position in which a greater portion of the area of the annular opening around the stationary base is exposed as compared to the first position of the outer skirt;

an annular inner skirt which fits in contiguous sliding relationship against an interior of the discharge opening, the inner skirt defining a flow retaining lip which is movable between a first position in which it is below the tangency of the bottom of the stockpiling structure and a second position in which it is spaced from the bottom of the stock piling structure; and separating the vehicle from the solids by moving the outer skirt to the first position and the inner skirt to the second position.

35. The method of claim 34 wherein the annular area exposed around the base of the stationary housing is less than the cross-sectional area of the pipeline through which the vehicle and solids are being expelled.

36. The method of claim 35 wherein the annular area exposed around the base of the stationary housing is less than the total cross-sectional area of the pipeline that carries vehicle and through which the solids and vehicle are expelled into the stockpiling structure.

37. The method of claim 34 further comprising the step of remobilizing the solids after draining the vehicle by raising the outer skirt to the second position and lowering the inner skirt to the first position, the outer skirt having an annular lower lip which defines the maximum height of the area exposed around the base of the housing, the angle of elevation of the lower lip of the outside skirt with reference to the edge of the discharge opening being substantially equal to but slightly less than the angle of repose of the solids.

38. The method of claim 33 wherein the particulate matter is coal.

39. The method of claim 27 wherein each rotary valve is further comprised of a second identical stationary plate, the paddle being rotatably carried between the stationary plates, the cutaway portions of the stationary plates being fixed in aligned relationship with one another.

40. The method of claim 5 wherein the inlet of each pumping tank is comprised of a rotary valve and the outlet of each pumping tank is comprised of a rotary valve.

41. The method of claim 40 wherein each rotary valve is comprised of a first stationary plate and a flat rotating paddle in face to face engagement with one another, the stationary plate and paddle each being provided with cutaway portions that are moved into aligned relationship to open the valve and moved out of aligned relationship to close the valve.

42. The method of claim 41 wherein each rotary valve is further comprised of a second stationary plate, the paddle being rotatably carried between the stationary plates, the cutaway portions of the stationary plates being fixed in aligned relationship with one another.

43. A method of transporting through a pipeline solid pieces having a diameter of more than two inches, the method comprising the steps of:

placing the solid pieces in a vehicle containing a lubricant for reducing friction;

pumping the large diameter solids and vehicle through the pipeline with a fluid piston pump;

expelling the vehicle and solids from the pipeline into a stockpiling structure having a bottom surface;

separating the vehicle from the solids by providing a mixing valve comprising:

an annular stationary housing around a discharge opening defined by the bottom surface of the stockpiling structure, the stationary housing having an annular opening around the base thereof;

an annular outer skirt slidably disposed in contiguous relationship with the interior of the annular stationary housing, the outer skirt being movable between a first position in which it closes a substantial portion of the area of the annular opening around the base of the stationary housing, and a second position in which a greater portion of the area of the annular opening around the stationary base is exposed as compared to the first position of the outer skirt; and an annular inner skirt which fits in contiguous sliding relationship against an interior of the discharge opening, the inner skirt defining a flow retaining lip which is movable between a first position in which it is below the tangency of the bottom of the stockpiling structure and a second position in which it is spaced from the bottom of the stockpiling structure.

44. The method of claim 43 wherein the annular area exposed around the base of the stationary housing is less than the cross-sectional area of the pipeline through which the vehicle and solids are being expelled.

45. The method of claim 44 wherein the annular area exposed around the base of the stationary housing is less than the total cross-sectional area of the pipeline that carries vehicle and through which the solids and vehicle are expelled into the stockpiling structure.

46. The method of claim 45 further comprising the step of remobilizing the solids after draining the vehicle by raising the outer skirt to the second position and lowering the inner skirt to the first position, the outer skirt having an annular lower lip which defines the maximum height of the area exposed around the base of the housing, the angle of elevation of the lower lip of the outside skirt with reference to the edge of the discharge opening being substantially equal to but slightly less than the angle of repose of the solids.

47. A method of transporting pieces of coal through a pipeline, the method comprising the steps of:
placing the coal in a vehicle having a specific gravity substantially equal to but less than the specific gravity of the coal, the vehicle further comprising a lubricant for reducing friction;
pumping the coal and vehicle through the pipeline with a fluid piston pump by introducing fluid under pressure into a fluid piston pumping tank;
recovering potential energy of the fluid under pressure in the pumping tank by:
establishing fluid communication between the pumping tank and a first energy recovery tank to bleed pressurized fluid to the first energy recovery tank;
then closing off fluid communication between the pumping tank and first energy recovery tank;
then establishing fluid communication between the pumping tank and a second energy recovery tank;
then introducing the fluid under pressure in the second energy recovery tank into the first energy recovery tank with a compressor before;
then compressing the pressurized fluid in the first energy recovery tank to a higher pressure; and
then introducing the fluid in the first energy recovery tank into the pumping tank to pump the vehicle and solid.

48. The method of claim 47 further comprising the steps
closing off fluid communication between the pumping tank and second energy recovery tank;
then opening the inlet from the pipeline into the pumping tank to allow the pumping tank to be filled and forcing remaining fluid under pressure in the pumping tank out of the pumping tank through a first blower to rotate a blower element, the blower element being connected by a common axle to a second blower which intakes air from outside the system and combines it with air through the first blower, the combined air from the first and second blowers being compressed and introduced into one of the energy recovery tanks.

49. The method of claim 48 further comprising the step of providing a flywheel which rotates with the common axle of the first and second blowers to provide rotational inertia.

50. The method of claim 49 further comprising the step of providing means for imparting torque to the common axle if rotation of a blower element of the second blower falls below a preselected value.

51. The method of claim 50 wherein a plurality of pumping tanks are provided which sequentially fill and empty their contents into the pipeline.

52. The method of claim 51 wherein the inlet of each pumping tank is comprised of a rotary valve and the outlet of each pumping tank is comprised of a rotary valve.

53. The method of claim 52 wherein each rotary valve is comprised of a first stationary plate and a flat rotating paddle in face to face engagement with one another, the stationary plate and paddle each being provided with cutaway portions that are aligned to open the valve and move out of aligned relationship to close the valve.

54. The method of claim 53 wherein each rotary valve is further comprised of a second stationary plate, the paddle being carried between the stationary plates, the cutaway portions of the stationary plates being fixed in aligned relationship with one another.

55. The method of claim 54 further comprising the steps of:
expelling vehicle and coal from the pipeline into a stockpiling structure having a bottom surface; and
separating the vehicle from the coal.

56. The method of claim 55 wherein the vehicle is separated from the coal with a mixing valve which is comprised of:
an annular stationary housing around a discharge opening defined by the bottom surface of the stockpiling structure, the stationary housing having an annular opening around the base thereof;
an annular outer skirt slidably disposed in contiguous relationship with the interior of the annular stationary housing, the outer skirt being movable between a first position in which it closes a substantial portion of the area of the annular opening around the base of the stationary housing, and a second position in which a greater portion of the area of the annular opening around the stationary base is exposed as compared to the first position of the outer skirt;

an annular inner skirt which fits in contiguous sliding relationship against an interior of the discharge opening, the inner skirt defining a flow retaining lip which is movable between a first position in which it is below the tangency of the bottom of the stockpiling structure and a second position in which it is spaced from the bottom of the stockpiling structure; and separating the vehicle from the coal by moving the outer skirt to the first position and the inner skirt to the second position.

57. The method of claim 56 wherein the annular area exposed around the base of the stationary housing is less than the cross-sectional area of the pipeline through which the vehicle and coal are being expelled.

58. The method of claim 57 wherein the annular area exposed around the base of the stationary housing is less than the total cross-sectional area of the pipeline that carries vehicle and through which the coal and vehicle are expelled into the stockpiling structure.

59. The method of claim 58 further comprising the step of remobilizing the coal after draining the vehicle by raising the outer skirt to the second position and lowering the inner skirt to the first position, the outer skirt having an annular lower lip which defines the maximum height of the area exposed around the base of the housing, the angle of elevation of the lower lip of the outside skirt with reference to the edge of the discharge opening being substantially equal to but slightly less than the angle of repose of the coal.

60. The method of claim 59 further comprising the step of establishing fluid communication between the pumping tank and a first energy recovery tank after the outlet is closed to bleed the pressurized fluid to the energy recovery tank, then compressing the pressurized fluid in the energy recovery tank to a higher pressure, then introducing the fluid at a higher pressure into a pumping tank.

61. The method of claim 60 further comprising:
closing off fluid communication between the pumping tank and first energy recovery tank;
establishing fluid communication between the pumping tank and a second energy recovery tank; and
introducing the fluid under pressure in the second energy recovery tank into the first energy recovery tank with a compressor before compressing the pressurized fluid in the first energy recovery tank to a higher pressure.

62. The method of claim 61 further comprising the steps of:
closing off fluid communication between the pumping tank and second energy recovery tank;
then opening the inlet from the pipeline into the pumping tank to allow the pumping tank to be filled and forcing remaining fluid under pressure in the pumping tank out of the pumping tank through a first blower to rotate a blower element, the blower element being connected by a common axle to a second blower which intakes air from outside the system and combines it with air that passed through the first blower, the combined air from the first and second blowers being compressed and introduced into one of the energy recovery tanks.

63. The method of claim 62 further comprising the steps of providing a flywheel which rotates with the common axle of the first and second blowers to provide rotational inertia.

64. The method of claim 63 further comprising the step of providing means for imparting torque to the common axle if rotation of a blower element of the second blower falls below a preselected value.

65. The method of claim 64 wherein wherein a plurality of pumping tanks are provided which sequentially fill and empty their contents into the pipeline.

66. The method of claim 65 wherein the inlet of each pumping tank is comprised of a rotary valve and the outlet of each pumping tank is comprised of a rotary valve.

67. The method of claim 66 wherein each rotary valve is comprised of a first stationary plate and a flat rotating paddle in face to face enggement with one another, the stationary plate and paddle each being provided with cutaway portions that are moved into aligned relationship to open the valve and moved out of aligned relationship to close the valve.

68. The method of claim 67 wherein each rotary valve is further comprised of a second stationary plate, the paddle being rotatably carried between the stationary plates, the cutaway portions of the stationary plates being fixed in aligned relationship with one another.

69. The method of claim 68 further comprising the steps of:
expelling vehicle and coal from the pipeline into a stockpiling structure having a bottom surface; and separating the vehicle from the coal.

70. The method of claim 69 wherein the vehicle is separated from the coal with a mixing valve which is comprised of:
an annular stationary housing around a discharge opening defined by the bottom surface of the stockpiling structure, the stationary housing having an annular opening around the base thereof;
an annular outer skirt slidably disposed in contiguous relationship with the interior of the annular stationary housing, the outer skirt being movable between a first position in which it closes a substantial portion of the area of the annular opening around the base of the stationary housing, and a second position in which a greater portion of the area of the annular opening around the stationary base is exposed as compared to the first position of the outer skirt;
an annular inner skirt which fits in contiguous sliding relationship against an interior of the discharge opening, the inner skirt defining a flow retaining lip whichis movable between a first position in which it is below the tangency of the bottom of the stockpiling structure and a second position in which it is spaced from the bottom of the stockpiling structure; and
separating the vehicle from the particulate matter by moving the outer skirt to the first position and the inner skirt to the second position.

71. The method of claim 70 wherein the annular area exposed around the base of the stationary housing is less than the cross-sectional area of the pipeline through which the vehicle and coal are being expelled.

72. The method of claim 71 wherein the annular area exposed around the base of the stationary housing is less than the total cross-sectional area of the pipeline that carries vehicle and through which the coal and vehicle are expelled into the stock piling structure.

73. The method of claim 72 further comprising the step of remobilizing the coal after draining the vehicle by raising the outer skirt to the second position and lowering the inner skirt to the first position, the outer skirt having an annular lower lip which defines the maximum height of the area exposed around the base of the housing, the angle of elevation of the lower lip of the outside skirt with reference to the edge of the discharge opening being substantially equal to but slightly less than the angle of repose of the coal.

74. The method of claim 73 wherein the diameter of the coal is greater than about one inch.

75. The method of claim 74 wherein the diameter of the coal is greater than about two inches.

76. The method of claim 75 wherein the diameter of the coal is greater than about six inches.

77. The method of claim 76 wherein the coal is eight to twelve inches in diameter.

78. The method of claim 77 wherein the lubricant is a polymer that increases the molecular length of the molecules of the vehicle.

79. The method of claim 78 wherein the lubricant is polyethylene oxide and the vehicle is comprised of water.

80. The method of claim 79 wherein the vehicle is comprised of a mixture of water and a salt, the salt being added to increase the specific gravity of the water to a specific gravity substantially equal to but slightly less than the specific gravity of the coal.

81. The method of claim 80 wherein the vehicle has a specific gravity of about 1.30.

82. The method of claim 81 wherein the salt is calcium chloride.

83. The method of claim 82 wherein the pipeline is comprised of a plastic material.

84. A method of transporting solids through a pipeline, the method comprising the steps of:
 placing the solids in a vehicle;
 pumping the solids and vehicle through the pipeline with a fluid piston pump by introducing fluid under pressure into a fluid piston pumping tank;
 recovering potential energy of the fluid under pressure in the pumping tank by:
 establishing fluid communication between the pumping tank and a first energy recovery tank to bleed pressurized fluid to the first energy recovery tank;
 then closing off fluid communication between the pumping tank and first energy recovery tank;
 then establishing fluid communication between the pumping tank and a second energy recovery tank;
 then introducing the fluid under pressure in the second energy recovery tank into the first energy recovery tank with a compressor;
 then compressing the pressurized fluid in the first energy recovery tank to a higher pressure; and
 then introducing the fluid in the first energy recovery tank into the pumping tank to pump the vehicle and solid.

* * * * *